(12) United States Patent  
Zhu

(10) Patent No.: US 11,598,627 B2
(45) Date of Patent: Mar. 7, 2023

(54) METHODS, SYSTEMS AND APPARATUS OF INTERFEROMETRY FOR IMAGING AND SENSING

(71) Applicant: VIRGINIA TECH INTELLECTUAL PROPERTIES, INC., Blacksburg, VA (US)

(72) Inventor: Yizheng Zhu, Blacksburg, VA (US)

(73) Assignee: VIRGINIA TECH INTELLECTUAL PROPERTIES, INC., Blacksburg, VA (US)

(*) Notice: Subject to any disclaimer, the term of this patent is extended or adjusted under 35 U.S.C. 154(b) by 488 days.

(21) Appl. No.: 16/075,174

(22) PCT Filed: Feb. 3, 2017

(86) PCT No.: PCT/US2017/016499
§ 371 (c)(1),
(2) Date: Aug. 3, 2018

(87) PCT Pub. No.: WO2017/136721
PCT Pub. Date: Aug. 10, 2017

(65) Prior Publication Data
US 2019/0056212 A1 Feb. 21, 2019

Related U.S. Application Data

(60) Provisional application No. 62/290,507, filed on Feb. 3, 2016.

(51) Int. Cl.
*G01B 9/02001* (2022.01)
*G01B 9/02004* (2022.01)
(Continued)

(52) U.S. Cl.
CPC ..... *G01B 9/02001* (2013.01); *G01B 9/02004* (2013.01); *G01B 9/02005* (2013.01);
(Continued)

(58) Field of Classification Search
CPC ............ G01B 9/02001; G01B 9/02004; G01B 9/02005
See application file for complete search history.

(56) References Cited

U.S. PATENT DOCUMENTS 3,658,405 A 4/1972 Pluta
5,420,717 A * 5/1995 Tabata .................. G01B 9/04
359/371

(Continued)

OTHER PUBLICATIONS

International Search Report and Written Opinion for PCT/US2017/016499 dated Apr. 14, 2017.
(Continued)

*Primary Examiner* — Violeta A Prieto
(74) *Attorney, Agent, or Firm* — Perilla Knox & Hildebrandt LLP; Jason M. Perilla

(57) ABSTRACT

Various methods, systems and apparatus are provided for imaging and sensing using interferometry. In one example, a system includes an interferometer; a light source that can provide light to the interferometer at multiple wavelengths ($\lambda_i$); and optical path delay (OPD) modifying optics that can enhance contrast in an interferometer output associated with a sample. The light can be directed to the sample by optics of the interferometer. The interferometer output can be captured by a detector (e.g., a camera) at each of the multiple wavelengths ($\lambda_i$). In another example, an apparatus includes an add-on unit containing OPD that can enhance contrast in an interferometer output associated with a sample illuminated by light at a defined wavelength ($\lambda_i$). A detector can be attached to the add-on unit to record the interferometer output at the defined wavelength ($\lambda_i$).

20 Claims, 17 Drawing Sheets

(51) Int. Cl.
*G01B 9/02002* (2022.01)
*G01B 9/04* (2006.01)
*G02B 27/52* (2006.01)
*G01B 9/02098* (2022.01)

(52) U.S. Cl.
CPC ..... *G01B 9/02007* (2013.01); *G01B 9/02098* (2013.01); *G01B 9/04* (2013.01); *G02B 27/52* (2013.01)

(56) References Cited

U.S. PATENT DOCUMENTS

| | | |
|---|---|---|
| 2005/0046865 A1 | 3/2005 | Brock et al. |
| 2005/0152030 A1* | 7/2005 | Shribak .................... G01B 9/04 359/371 |
| 2008/0007824 A1* | 1/2008 | Shribak .................... G01B 9/04 359/371 |
| 2008/0165347 A1* | 7/2008 | Groot ................. G01B 9/02007 356/73 |
| 2010/0091296 A1* | 4/2010 | de Groot ............ G01B 9/02027 356/508 |
| 2010/0128278 A1 | 5/2010 | Deck et al. |
| 2011/0026033 A1* | 2/2011 | Trolinger ........... G01M 11/0257 356/450 |
| 2011/0228260 A1* | 9/2011 | Yablon .................. G01N 21/45 356/73.1 |
| 2011/0237999 A1* | 9/2011 | Muller ................. A61N 5/0625 604/20 |
| 2012/0069326 A1 | 3/2012 | De Lega et al. |
| 2012/0262561 A1 | 10/2012 | Fukutake et al. |
| 2013/0128264 A1 | 5/2013 | Wax et al. |
| 2013/0265585 A1* | 10/2013 | Fang-Yen .......... G01B 9/02007 356/497 |
| 2015/0043006 A1* | 2/2015 | de Groot .............. G01B 9/0209 356/497 |
| 2015/0100012 A1* | 4/2015 | Muller .................. A61B 3/107 604/20 |
| 2015/0146748 A1* | 5/2015 | Kaganovich ......... G02B 26/001 359/349 |
| 2019/0212124 A1* | 7/2019 | Zalevsky ........... G01B 9/02095 |
| 2019/0265024 A1* | 8/2019 | Odaira ............... G01B 11/2513 |
| 2021/0101020 A1* | 4/2021 | Muller ................ A61N 5/0625 |
| 2021/0149337 A1* | 5/2021 | Wei ........................ G01B 9/04 |
| 2022/0299892 A1* | 9/2022 | Eralp ................... G03F 9/7088 |

OTHER PUBLICATIONS

Jingping Fan et al.; "Simultaneous multi-wavelength phase-shifting interferometry based on principal component analysis with a color CMOS"; J. Opt. 18 055703 (2016); pp. 1-13.

Masato Higashi et al.; "Wavelength-shifting interferometry by a wide tunable laser source with a new phase-shifting technique," Proc. SPIE 5633, Advanced Materials and Devices for Sensing and Imaging II, (Jan. 20, 2005); doi 10.1117/12.580464.

Masakazu Suematsu et al.; "Wavelength-shift interferometry for distance measurements using the Fourier transform technique for fringe analysis"; Applied Optics vol. 30, No. 28 (Oct. 1, 1991).

Yeou-Yen Cheng et al.; "Multiple-wavelength phase-shifting interferometry"; Applied Optics vol. 24, No. 6; (Mar. 15, 1985).

* cited by examiner

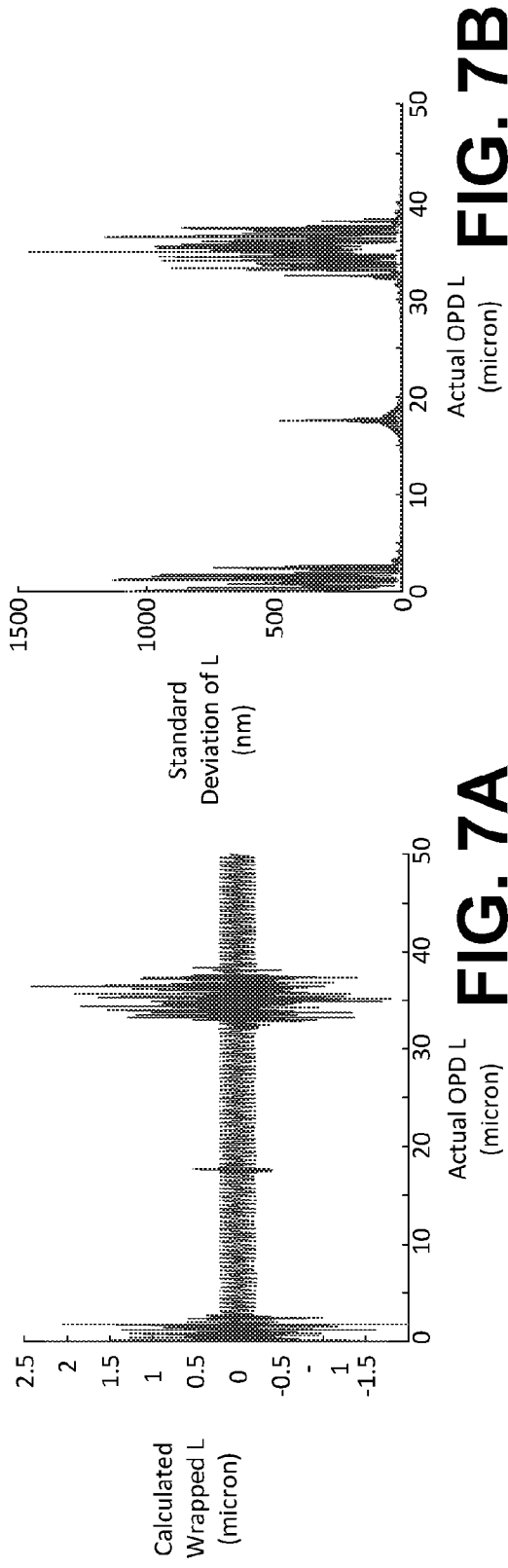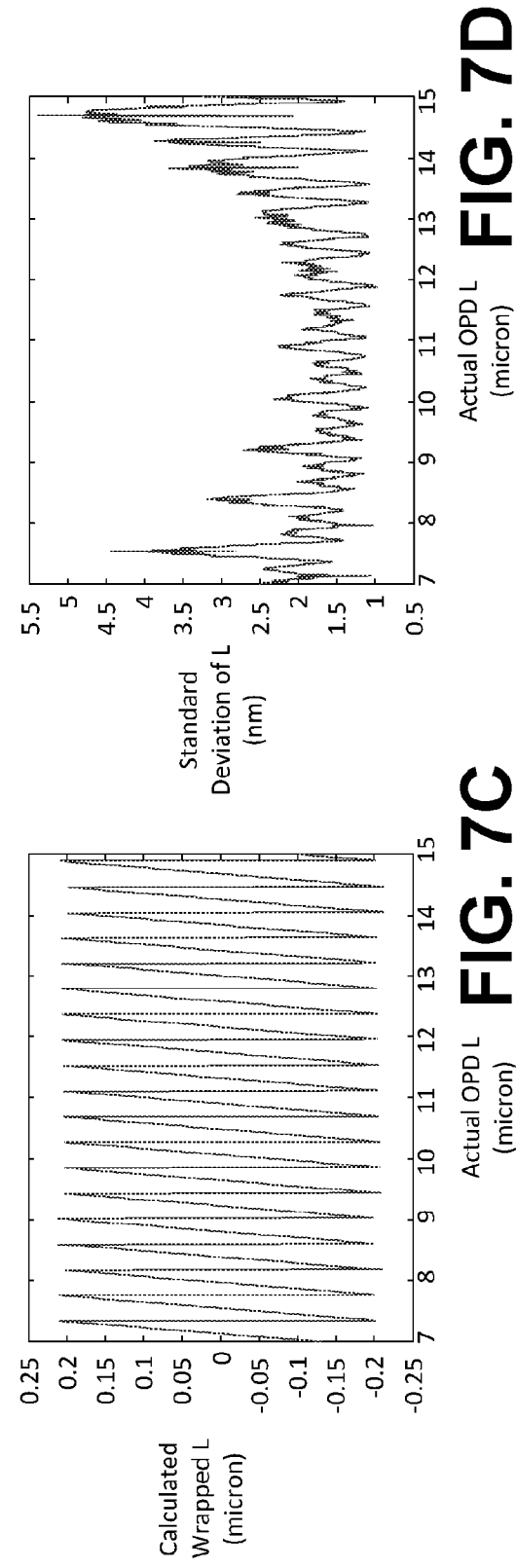
FIG. 7A
FIG. 7B
FIG. 7C
FIG. 7D

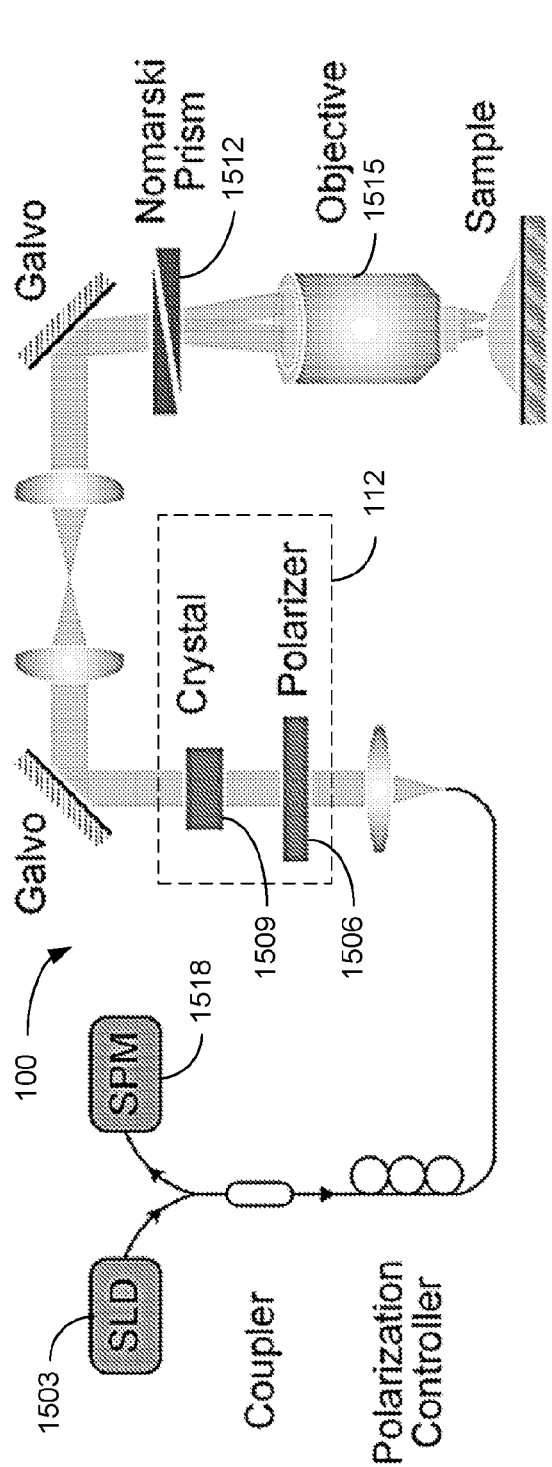
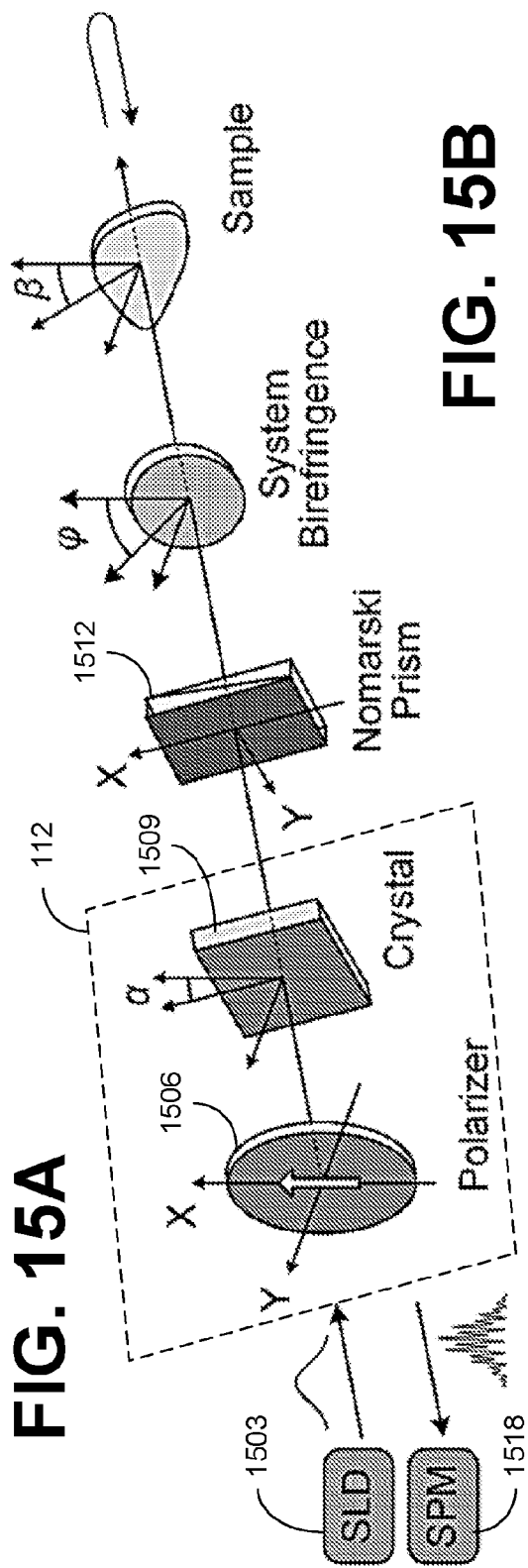
FIG. 15A
FIG. 15B

METHODS, SYSTEMS AND APPARATUS OF INTERFEROMETRY FOR IMAGING AND SENSING

CROSS REFERENCE TO RELATED APPLICATIONS

This application is the 35 U.S.C. § 371 national stage application of PCT Application No. PCT/US2017/016499, filed Feb. 3, 2017, where the PCT claims priority to, and the benefit of, U.S. provisional application entitled "Methods and Apparatus of Interferometry for Imaging and Sensing" having Ser. No. 62/290,507, filed Feb. 3, 2016, both of which are herein incorporated by reference in their entireties.

This application claims priority to, and the benefit of, U.S. provisional application entitled "Methods and Apparatus of Interferometry for Imaging and Sensing" having Ser. No. 62/290,507, filed Feb. 3, 2016, the entirety of which is hereby incorporated by reference.

BACKGROUND

Interferometry is an enabling technique used in measurement and imaging devices that, over the decades, has become indispensable in research and industry. Nearly all modern microscopes have built-in phase contrast (PhC) microscopy, differential interference contrast (DIC) microscopy, and/or polarized light microscopy capabilities, all of which are based on interferometry. For example, these interferometric microscopy techniques have been widely used for observing biological specimens in life sciences. Interferometry has also found wide application in inspecting semiconductor and optical components, where optical surface profilers rely on it to accurately map surface topographies.

SUMMARY

Aspects of the present disclosure are related to imaging and sensing using interferometry. Various examples of methods, systems and apparatus related to interferometry for imaging and sensing are disclosed.

In one embodiment, among others, a system for imaging and sensing of a sample, comprises an interferometer configured to receive a sample; a light source configured to provide light to the interferometer at multiple wavelengths ($\lambda_i$), where the light is directed to the sample by optics of the interferometer; and optical path delay (OPD) modifying optics configured to enhance contrast in an interferometer output associated with the sample, the interferometer output captured by a detector at each of the multiple wavelengths ($\lambda_i$). In one or more aspects of these embodiments, the light can be a band of light having wavelengths centered about the wavelength ($\lambda_i$). The light source can comprise light emitting diodes (LEDs) or lasers configured to provide the light at the multiple wavelengths ($\lambda_i$). The light source can comprise a tunable light emitting diode (LED) or a tunable laser configured to provide the light at the multiple wavelengths ($\lambda_i$).

In one or more aspects of these embodiments, the system can comprise one or more filters configured to filter broadband light to provide the interferometer output at each of the multiple wavelengths ($\lambda_i$). The light source can comprise a broadband light source. The one or more filters can comprise a plurality of bandpass filters in the light source. The one or more filters can comprise a pixelated filter mask. The OPD modifying optics can comprise one or more birefringent crystals and one or more polarizers. The OPD modifying optics comprise one or more phase plate. The OPD modifying optics further comprise a 4-f optical system or an equivalent imaging system. The interferometer can comprise a light microscope.

In another embodiment, an apparatus for quantitative imaging or sensing of a sample comprises optical path delay (OPD) modifying optics configured to modify an interferometer output associated with a sample illuminated in an interferometer by light at one or more defined wavelength ($\lambda_i$); and an add-on unit containing the OPD modifying optics, the add-on unit configured to attach to the interferometer thereby aligning the OPD modifying optics with the interferometer output, and configured to attach to a detector configured to record the interferometer output. In one or more aspects of these embodiments, the interferometer can comprise a light microscope. The light can come from a light source configured to change wavelength without using filters.

In one or more aspects of these embodiments, the OPD modifying optics comprise a phase plate positioned between relay lenses. The add-on unit can comprise one or more filters aligned with the OPD modifying optics. The one or more filters can comprise a pixelated filter mask or a plurality bandpass filters. The OPD modifying optics can comprise at least one birefringent crystals and at least one polarizer. The add-on unit can be configured to switch between different configurations of the OPD modifying optics.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 7A-7D and 8 illustrate simulation results for the interferometry system of FIG. 5, in accordance with various embodiments of the present disclosure.

FIGS. 15A and 15B illustrate an example of the interferometry system of FIGS. 1A and 1B, in accordance with various embodiments of the present disclosure.

DETAILED DESCRIPTION

Figure 1A:
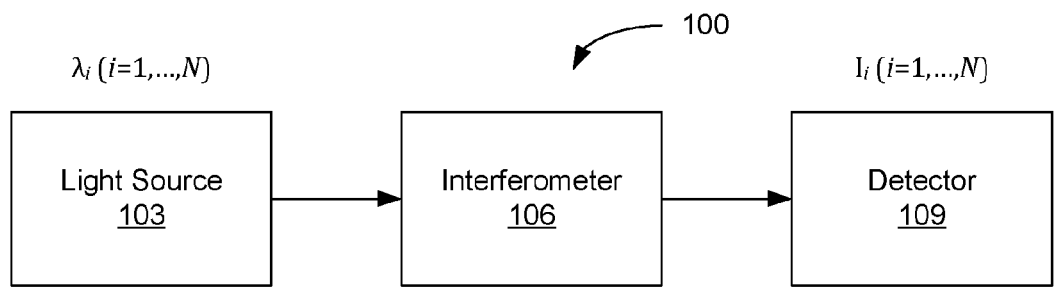
FIGS. 1A and 1B are block diagrams illustrating examples of an interferometry system, in accordance with various embodiments of the present disclosure.

Disclosed herein are various embodiments related to imaging and sensing using interferometry. This technology can be used to quantify the complex field of a sample, offering a combination of low cost, simple implementation, high speed and/or high sensitivity. Its applications include but are not limited to imaging and measurement of biological or non-biological specimens, solid or liquid surfaces, or other samples. The disclosed technique is compatible with a wide variety of existing interferometers, and may be implemented with minimal hardware modification, allowing for easy interfacing and upgrade. Various aspects can also be integrated with mobile devices to generate a new category of portable imaging and sensing devices. Reference will now be made in detail to the description of the embodiments as illustrated in the drawings, wherein like reference numbers indicate like parts throughout the several views.

Interferometry often measures the optical path delays (OPD, or optical pathlength difference) associated with a sample, which may be transparent, translucent, opaque, scattering or reflective. In a transparent/translucent sample, the OPD is usually caused by the change of the speed of light due to varying refractive index and/or thickness of the sample. In an opaque/reflective sample, OPD is typically caused by the difference in surface height at different locations. Some interferometric techniques measure the sample path delay by comparing it to that of a reference light field. This is called two-beam interferometry, and the OPD between the two beams is an important parameter. The methodology can also be applied to interferometry based on three or more beams or continuous wave field interferometry.

Referring to FIG. 1A, shown in a block diagram illustrating the basic components of an interferometry system 100 for imaging and sensing. The system 100 includes a light source 103 that can produce controlled light outputs corresponding to different wavelengths $\lambda_i$ (i=1, . . . , N), an interferometer 106 for testing a sample, and a detector 109 that can record, for each wavelength, the output of the interferometer 106. Each light output can be at a single wavelength $\lambda_i$ (or frequency $f_i$) or can include a band of wavelengths (or frequencies) centered about $\lambda_i$. The system 100 is capable of acquiring the interferometer output for each $\lambda_i$ using the detector 109. The recorded interferometer data can be processed to determine, e.g., the complex amplitude of the sample. For example, intensity images $I_i(x, y)$ of the interferometer 106 (such as, e.g., a PhC microscope or DIC microscope) can be recorded for $\lambda_i$ using a camera as the detector 109. Processing the intensity information $I_i$ (i=1, . . . , N) results in sample OPD information.

One advantage of the disclosed system 100 is its simple implementation and low cost potential. The technology can be used in a wide variety of interferometry systems with no or minimal modification of the existing interferometer 106, enabling easy interfacing and upgrade. The methodology also permits the use of both narrow bandwidth lasers and low coherence (spatial or temporal) sources, and thus can be applied in not only traditional laser-based interferometry but also in low coherence interferometry, such as low coherence holography.

The light source 103 can be configured to emit a range of wavelengths. Examples of light sources 103 include, but are not limited to, halogen lamps, light emitting diodes (LED), edge-emitting LEDs, superluminescent diodes (SLD), tunable/swept wavelength sources (or lasers), or a combination of multiple lasers. Other suitable light sources 103 can also be utilized. In some implementations, the light source 103 can include filtering to facilitate the provision of a single wavelength $\lambda_i$ of light or a fixed range (or band) of wavelengths about $\lambda_i$. A plurality of wavelengths (or wavelength bands) can be used to the imaging and sensing. For example, two, three, four, five or more wavelengths (or bands) $\lambda_i$ can be used for imaging the sample. The wavelengths (or bands) can be evenly spaced within a wavenumber domain, or can be distributed in a different fashion (e.g., separated by linearly increasing distances or other specified distribution). The bandwidth can also be the same for each of the wavelength bands or can vary based upon any of a variety of factors.

The detector 109 can be a photodetector or image capture device such as, but is not limited to, photodiodes (PDs), avalanche PDs, photomultipliers, CCD/EMCCD/CMOS (charged-coupled device/electron multiplying CCD/complementary metal-oxide-semiconductor) line or area cameras and other types of cameras, or other suitable photodetectors. Image capture devices can include scientific grade cameras used in research labs or consumer cameras including cameras on laptops, cellphones, tablets or other mobile devices.

Processing of the recorded interferometer data (e.g., camera images) can utilize modeling of the corresponding interferometric process. Existing algorithms of multi-shot interferometry, such as phase-shifting interferometry (PSI), may be used. In alternative implementations, algorithms based on regression (fitting), such least square methods, or other appropriate modeling can be used. Numerical solutions such as those based on, e.g., least square regression can be used for processing the recorded interferometer data at the different wavelengths. The center wavelengths, their bandwidth and spectral shape can be determined for the wavelength bands using the measured data, and this information can used as known parameters for the algorithms.

The interferometer 106 can be any of a wide variety of configurations. Examples of interferometers 106 include, but are not limited to, Fabry-Pérot interferometers, Michelson interferometers, Mach-Zehnder interferometers, Linnik interferometers, Fizeau interferometers, Sagnac interferometers, or other interferometers that utilize PhC microscopy, DIC microscopy, diffraction phase microscopy, Fourier ptychography, and/or holography.

The optics in both the reference and sample arms of the interferometer 106 can vary depending on the imaging requirements. For instance, 4-f optical systems or other equivalent imaging systems can be inserted to change resolution and/or field of view or to facilitate path length matching or mismatching. The interferometer 106 can also contain beamsplitters, which can be optical fiber-based (e.g., a fiber-optic coupler), or free space-based (e.g., a beamsplitter cube), or can be based upon other suitable components.

Figure 1B:
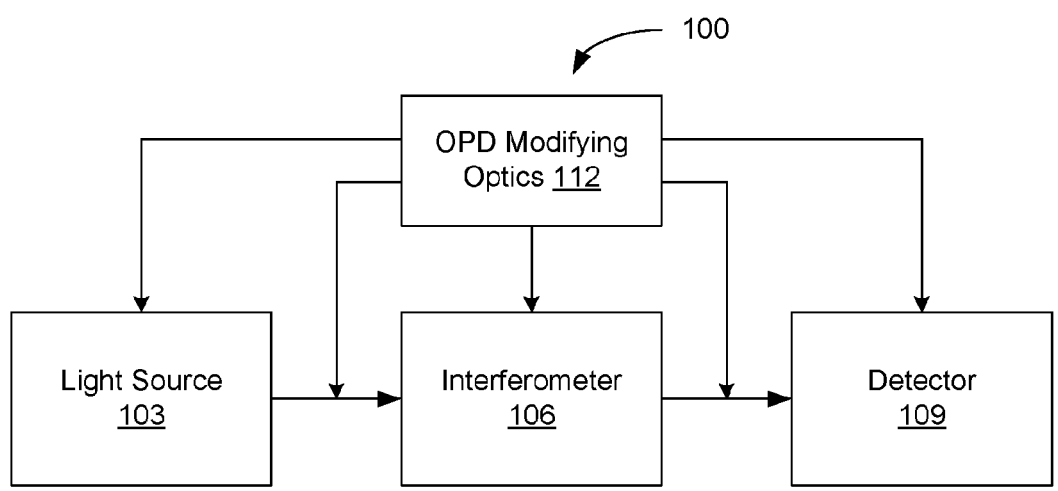

For some interferometers, the OPD between the reference and sample signals may not be optimal for the desired application. To improve or optimize the output, OPD modifying optics 112 can be added at various positions in the system 100. As illustrated in FIG. 1B, some or all of the modifying optics 112 can be located inside the light source 103, the interferometer 106, and/or the detector 109, or some or all of the modifying optics 112 may be located between these elements.

In one embodiment, the OPD modifying optics 112 comprise a birefringent crystal inserted in a DIC microscope to achieve quantitative DIC imaging. The crystal can be any type of crystal that produces birefringence. A typical DIC microscope has an OPD between the two polarizations of light on the order of a fraction of the system wavelength. The inserted birefringent crystal can increase (or sometimes decrease) this OPD to achieve an improved or optimal operating condition. The "optimal operating conditions" can provide higher measurement sensitivity for the interferometry system 100.

Figure 2A:
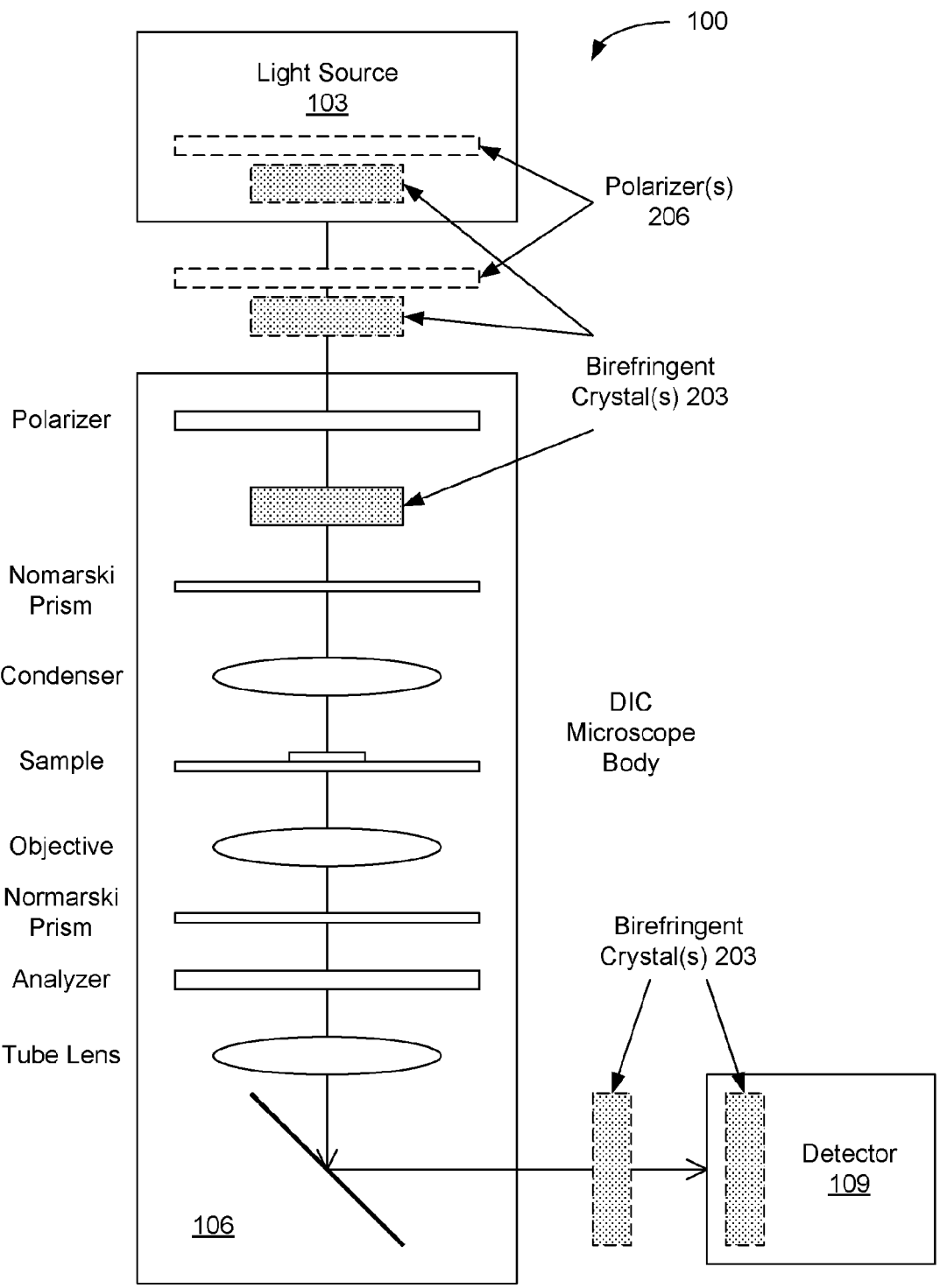
FIGS. 2A, 2B and 3 illustrate examples of the interferometry system of FIGS. 1A and 1B, in accordance with various embodiments of the present disclosure.

The birefringent crystal can be inserted almost anywhere in the microscope. As shown in FIG. 2A, the birefringent crystal 203 can be in the light source 103 of the microscope, in the main optical train (e.g., condenser optics, objective and tube lens) forming the interferometer 106, or in its detector (camera) 109, or in between these elements. If the insertion point is before the microscope's own polarizer (such as in the light source 103), an additional polarizer 206 will be needed before the crystal 203. The orientation of the crystal 203 (the direction of the slow axis), and possibly the additional polarizer 206, are typically aligned with other polarizing components of the microscope (such as, e.g., the existing polarizer or Nomarski prisms).

Figure 2B:
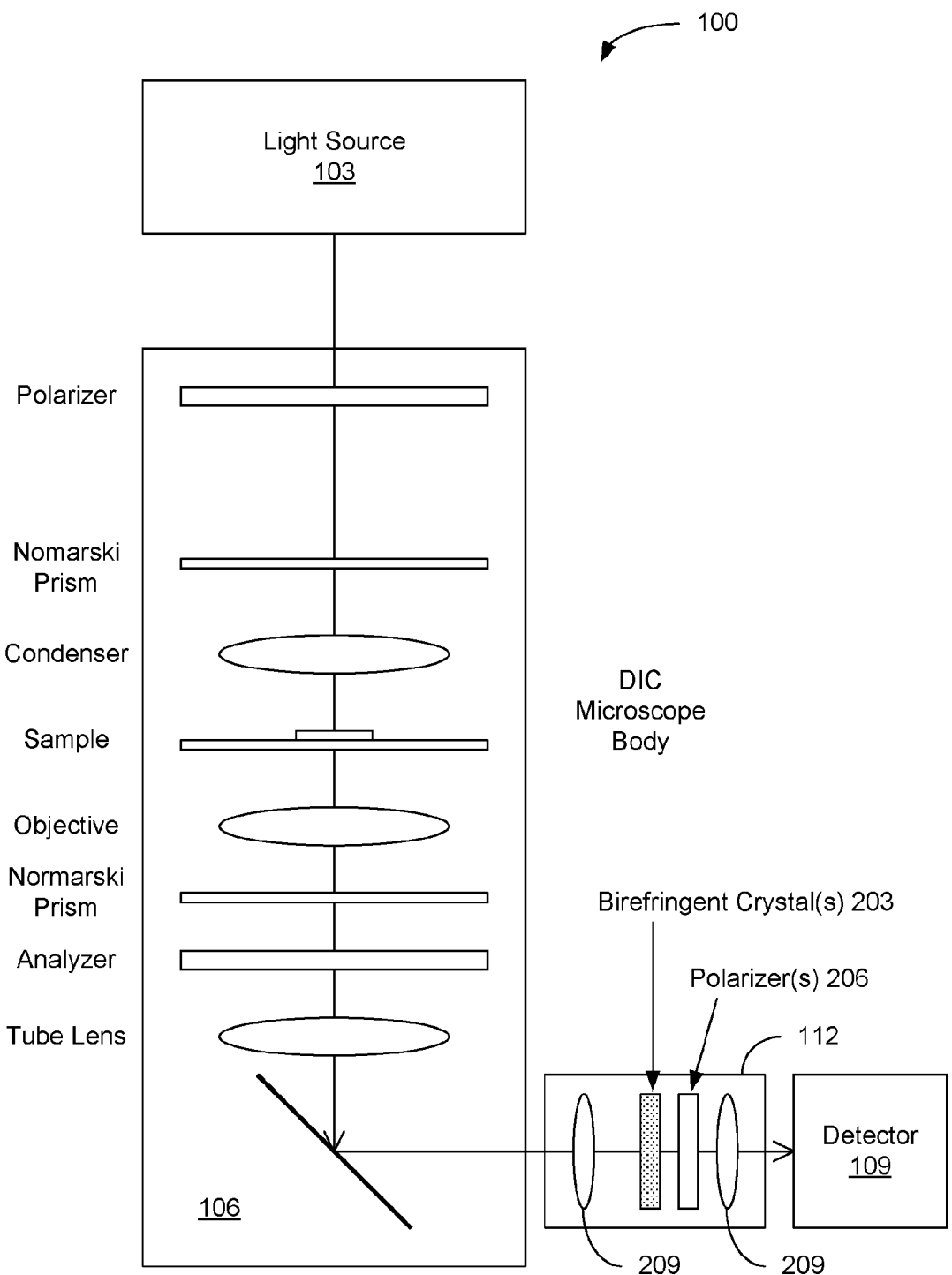

In another embodiment, two or more birefringent crystals can be inserted for quantitative polarized light imaging to quantify sample birefringence. The orientation of each of the birefringent crystals may be different to create polarization mixing in order to encode a sample birefringence signal into the detected signal, which is different for each wavelengths. In addition to the polarizers already in the interferometer 106, additional polarizers may be included depending on the location of the inserted crystals. FIG. 2B illustrates an example of OPD modifying optics 112 including the birefringent crystal(s) 203 and polarizer(s) 206, and a lens system 209 as needed to direct the interferometer output. The OPD modifying optics 112 can be configured as an add-on unit that can be coupled to the interferometer (or microscope) 106. The detector 109 may also be combined with the optics 112 to form an integrated add-on unit.

Figure 3:
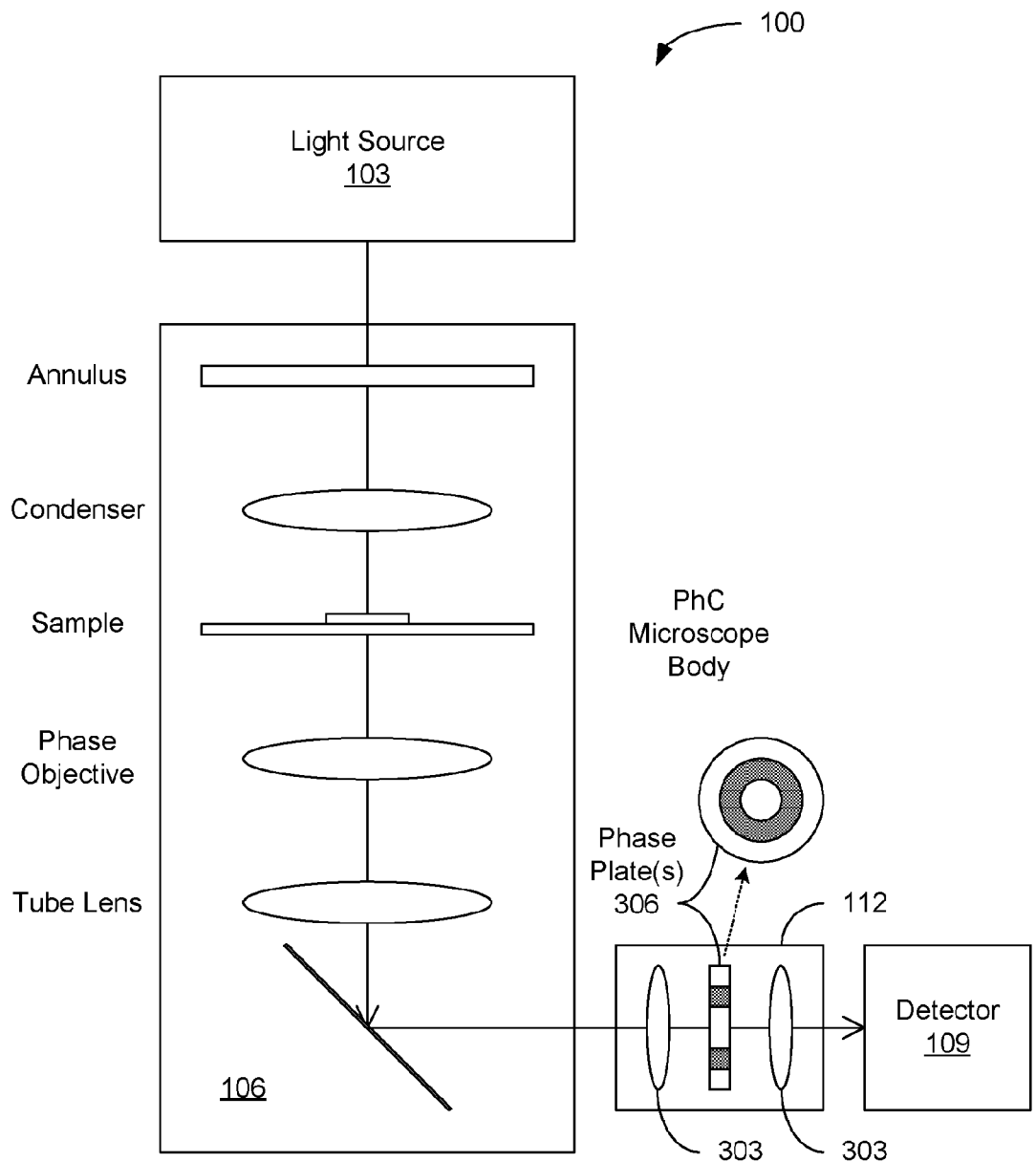

In another embodiment, a PhC microscope can be used for quantitative PhC imaging. The typical OPD is sub-wavelength between the un-diffracted surround (reference) wave and the diffracted sample wave of the PhC microscope. As shown in FIG. 3, the additional OPD modifying optics 112 can be added to the output port of the interferometer 106 (i.e., after the tube lens of the microscope) and before the detector (or camera) 109. The OPD modifying optics 112 can comprise a two-lens relay system that relays the output image of the microscope onto the camera. In between the two lenses 303 is placed a phase plate 306 that is conjugate to the phase objective (or phase plate of the objective) and the condenser annulus. This added phase plate 306 will modify the OPD between the surround wave and sample wave already generated by the phase objective in order to achieve better performance. For example, the phase plate 306 can be manufactured by etching or coating a ring pattern on a glass plate. Etching reduces the thickness of the ring as compared to the rest of the glass plate, while deposition (coating) increases its thickness. The structure of the phase plate 306 is illustrated in FIG. 3. The OPD modifying optics 112 can be configured as an add-on unit that can be coupled to the interferometer (or microscope) 106. The detector 109 may also be combined with the optics 112 for form an integrated add-on unit.

In another embodiment, a Mach-Zehnder interferometer can be used. The OPD can be modified by adding glass plates of different thickness in the sample and reference arms, or by slightly changing the distance of the optical components. This will be discussed further below.

Figure 4A:
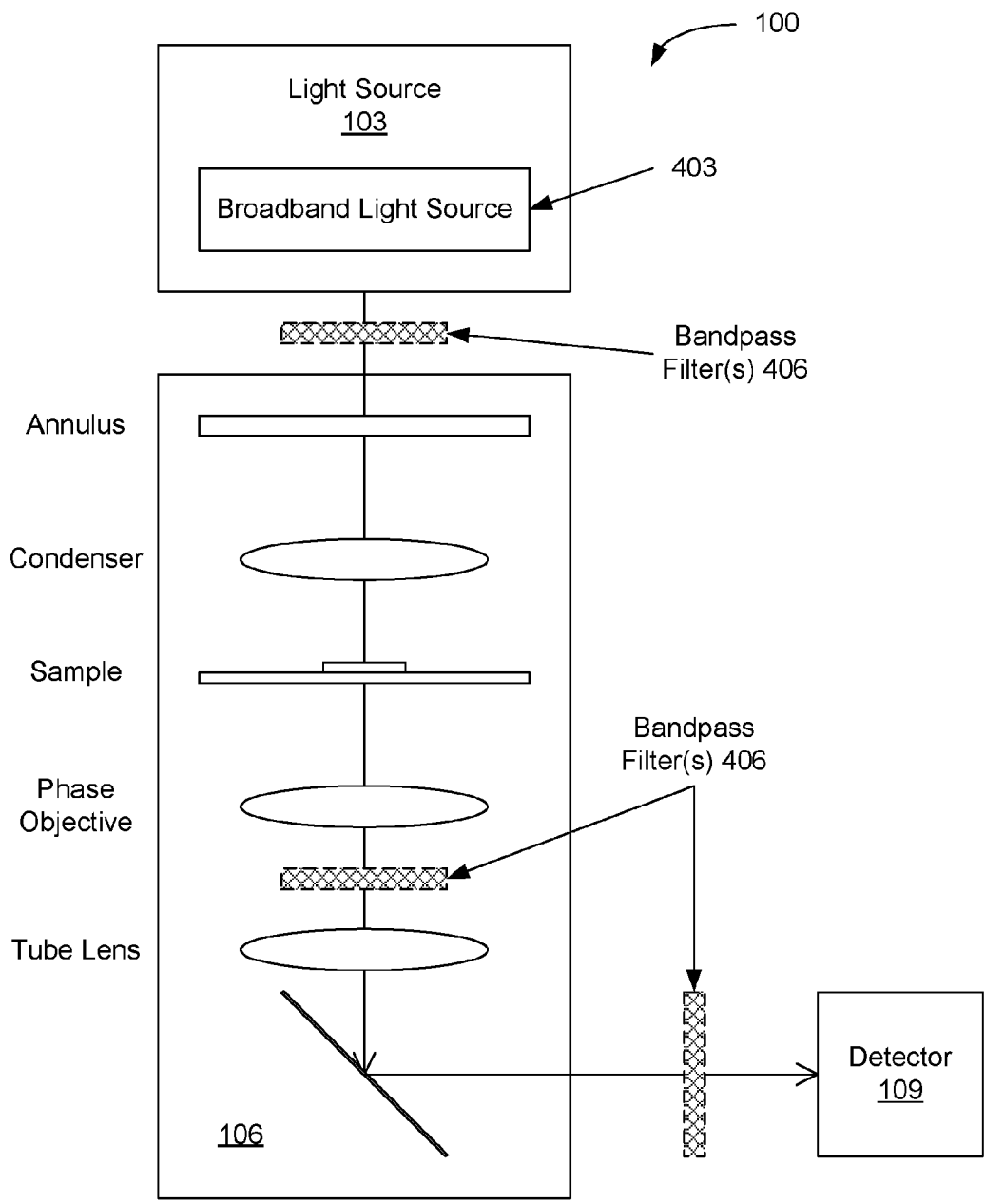
FIGS. 4A through 4C illustrate examples of light sources for the interferometry systems of FIGS. 1A and 1B, in accordance with various embodiments of the present disclosure.
Figure 4B:
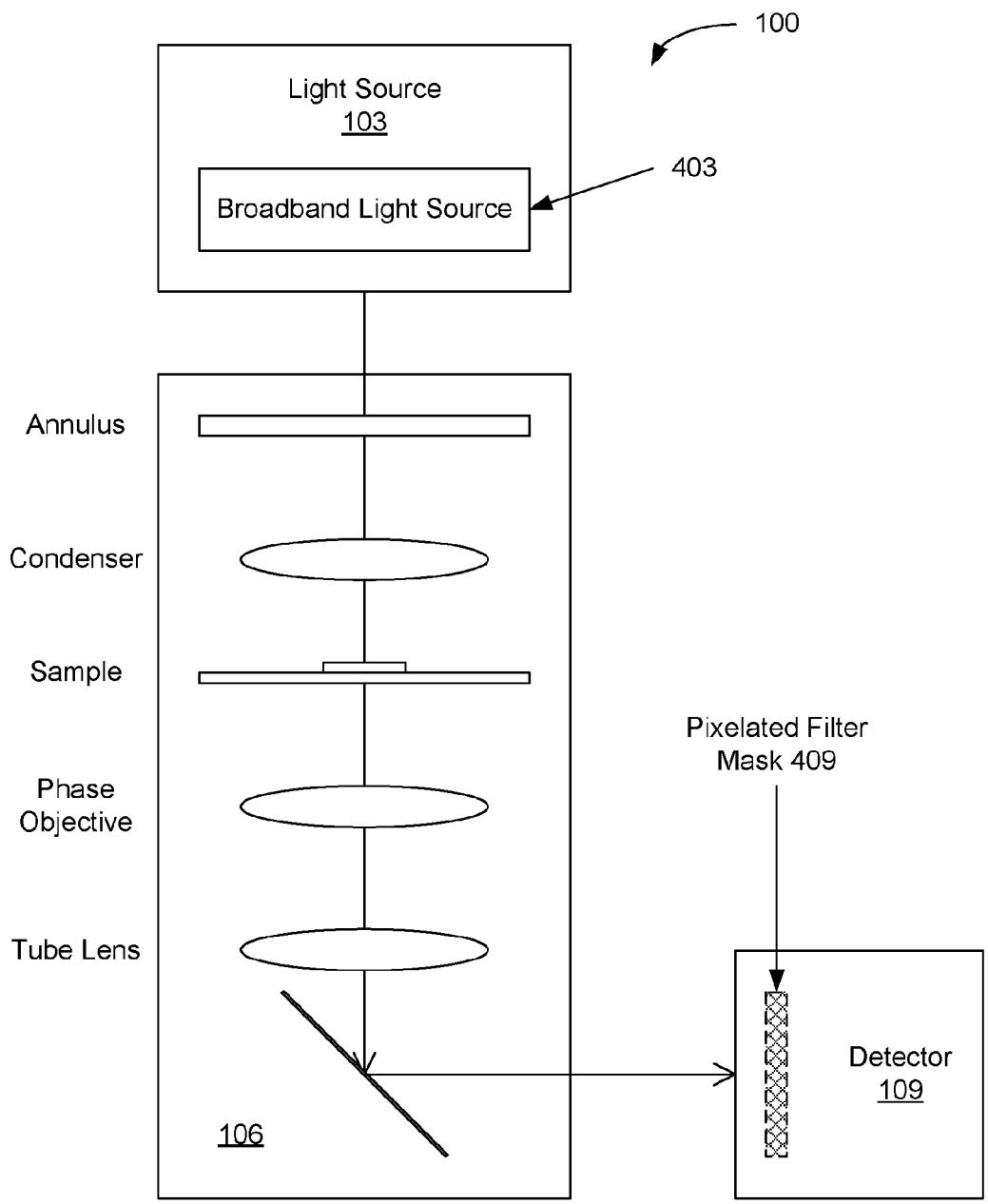
Figure 4C:
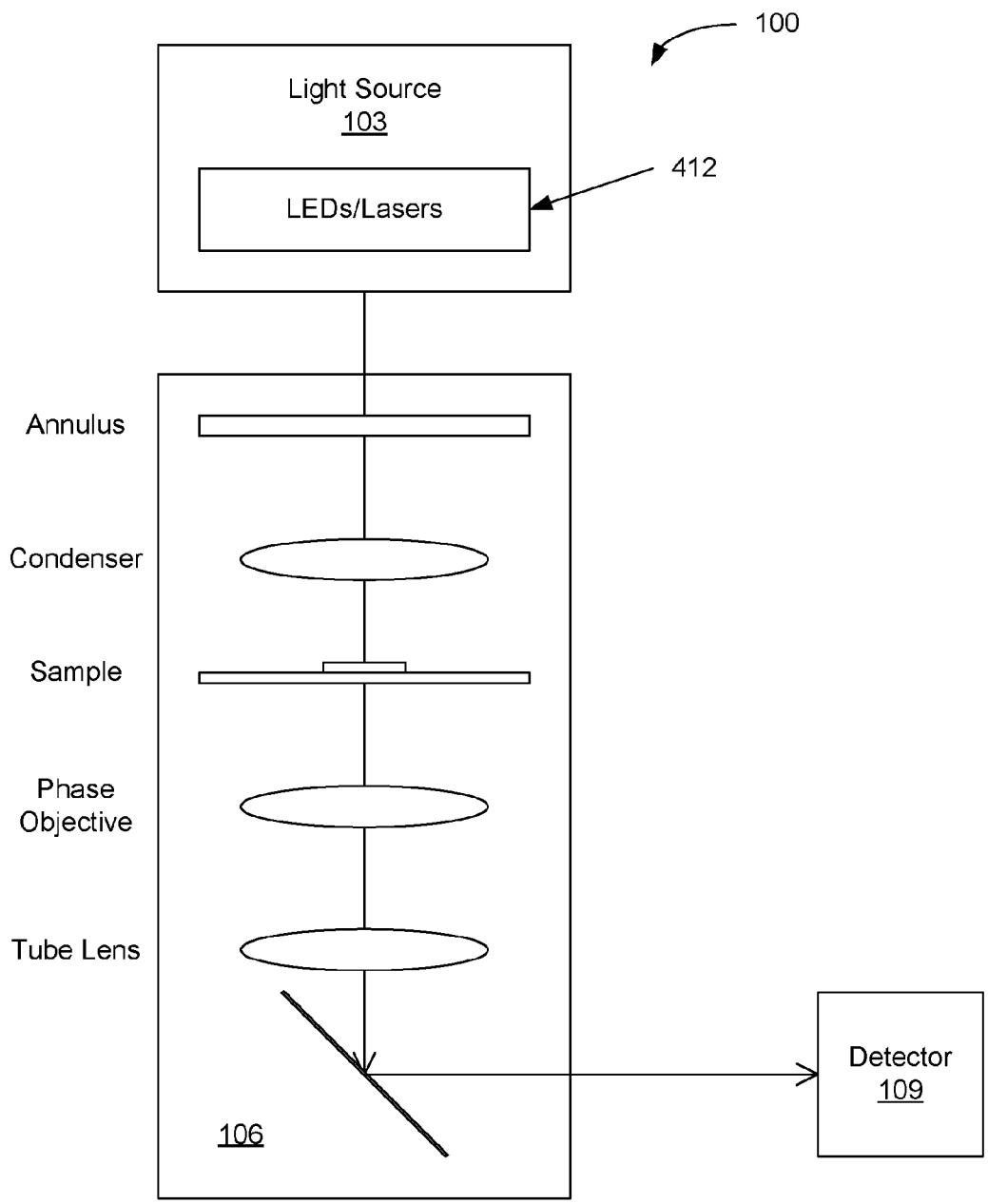

The light source 103 is configured to generate multiple wavelengths ($\lambda_i$) of light or bands of wavelengths centered at $\lambda_i$, which can be accomplished in a variety of ways. FIGS. 4A-4C illustrate examples of different light source configurations. As shown in FIG. 4A, the light source 103 can include a broadband source 403 such as, e.g., halogen lamps, LEDs or SLDs. To select the wavelengths (or wavelength bands), one or more bandpass filters 406 can be added for the selection of the transmitted wavelength (or wavelength band). The bandpass filters 406 can be located in different positions in the interferometry system 100, including in the light source 103, inside the interferometer 106 or in the detector 109. The bandpass filters 406 may also be included between the elements or as part of the OPD modifying optics 112. FIG. 4A shows the bandpass filters 406 located in three of the possible locations. These filters 406 can be enabled (e.g., sequentially) to acquire images at the corresponding wavelength (or band) $\lambda_i$. In the example of FIG. 4B, the light source 103 again includes a broadband light source 403. In this case, a pixelated filter mask 409 can be placed before or included in the detector 109 (e.g. a camera sensor), such that each camera pixel will record light for a specific wavelength (or band) $\lambda_i$. For example, a Bayer filter can be provided in a color camera, allowing a single camera shot to record images at different wavelengths (or bands) $\lambda_i$.

In other embodiments of the interferometry system 100, the light source 103 can comprise multiple LEDs and/or lasers configured to generate multiple wavelengths (or wavelength bands) $\lambda_i$ of light as shown in FIG. 4C. For example, an array of LEDs/lasers can be provided to provide the different wavelengths (or wavelength bands) $\lambda_i$ in a controllable fashion. The LEDs/lasers can be separately switched ON and OFF to individually record images of the sample at each wavelength (or wavelength band) $\lambda_i$ with the detector 109. In some implementations, the light source 103 can comprise can comprise one or more tunable laser and/or tunable LED, which can be controlled to provide multiple wavelengths (or wavelength bands) $\lambda_i$ of light. It should be noted that while FIGS. 4A-4C depict the interferometer 106 as a PhC microscope, the configuration is equally applicable to other interferometer implementations. Coordination of the light source 103 and/or detector 109 for collection of interferometer data can be accomplished by processing circuitry in e.g., a computer, smartphone, tablet or other computing or control device. The add-in unit can include the processing circuitry (e.g., a processor and memory) or can be configured to interface with the processing circuitry in a computing or control device.

Figure 5:
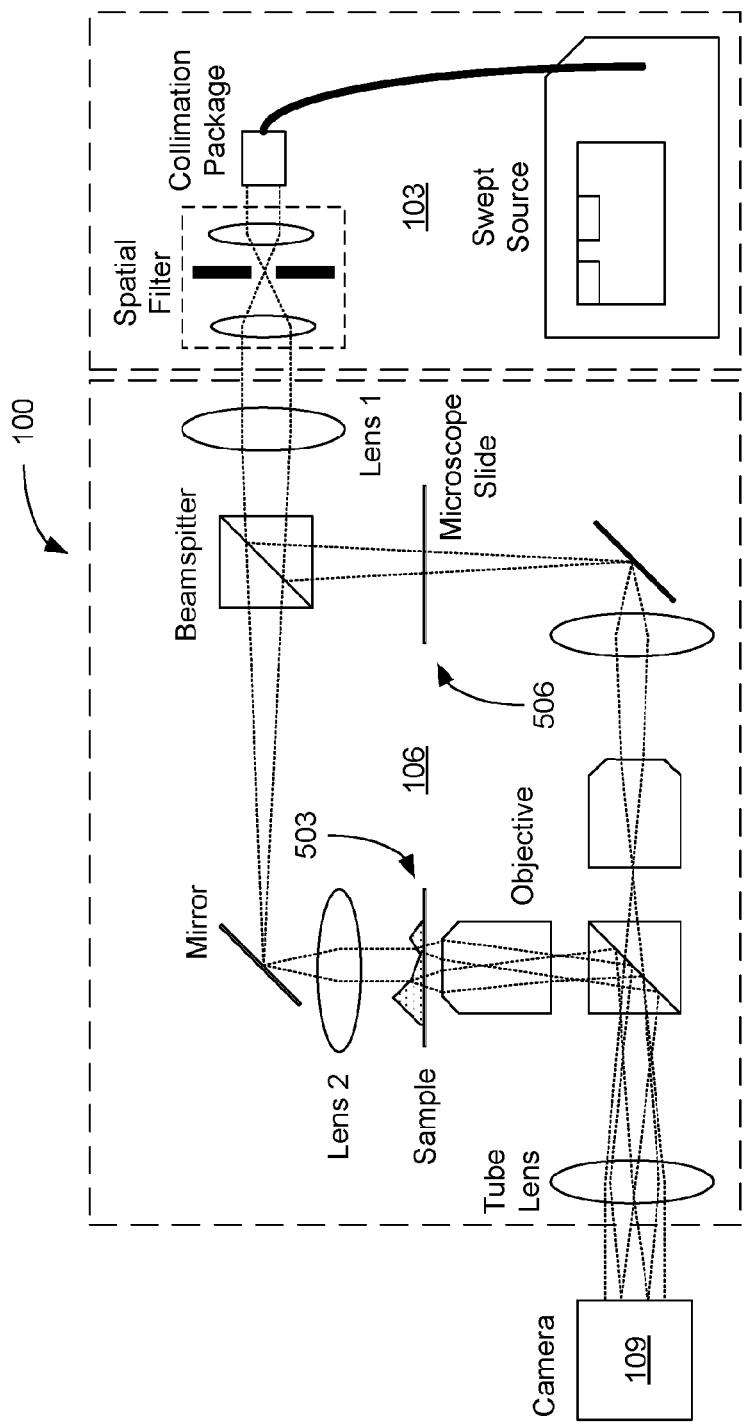
FIG. 5 illustrates an example of an implemented interferometry system of FIGS. 1A and 1B, in accordance with various embodiments of the present disclosure.

Referring next to FIG. 5, shown is a schematic diagram illustrating an example of an interferometry system 100 that was implemented for testing. The system 100 included a Mach-Zehnder interferometer 106 comprising a sample arm 503 with a sample disposed on a microscope side and a reference arm 506 including a microscope slide without a sample. The light source 103 utilized a swept laser source and a 2D camera was used as the detector 109. The swept laser source (e.g., Superlum Inc; BS-840-1, 802-878 nm) can be tuned across a wavelength range that is much wider compared to its linewidth. The light from the light source 103 is passed into the sample and reference arms of the Mach-Zehnder interferometer 106. With the objectives and tube lens, the sample field and the reference field are imaged onto the camera 109, which captures the intensity image of the interference between the two fields.

While the swept source scans, within the exposure time, the camera will capture the interference for a band of wavelength centered at $\lambda_i$ (or wavenumber $k_i$). The interference intensity can be written as:

$$I_i(x,y)=A_i+B_i \cos k_i L, i=1,\ldots,N, \quad (1)$$

where $A_i$ and $B_i$ are intensity constants and $k_i=2\pi/\lambda_i$ is the wavenumber and L is the OPD between the sample and reference arms. To modify and optimize L, glass slides and coverslips can be inserted into one or both of the sample and reference arms.

As an example, assume that N=4 and that $k_i$ are evenly spaced in the wavenumber domain (e.g., 870 nm, 849.04 nm, 829.06 n, and 810 nm). The wavenumbers can then be written as:

$$k_i=k_0+(2i-5)\Delta k, i=1,2,3,4, \quad (2)$$

where $k_0$ is the center of the full scan range and $2\Delta k$ is the spacing. Using Carre's equation and assuming $A_i$'s and $B_i$'s are independent of i, the (wrapped) OPD of the sample is given by:

$$L = \frac{1}{k_0}\arctan\left\{\frac{\sqrt{[3(I_2 - I_3) - (I_1 - I_4)][(I_2 - I_3) + (I_1 - I_4)]}}{[(I_2 + I_3) - (I_1 + I_4)]\text{sgn}[(I_2 - I_3) + (I_1 - I_4)]}\right\}, \quad (3)$$

Figure 6:
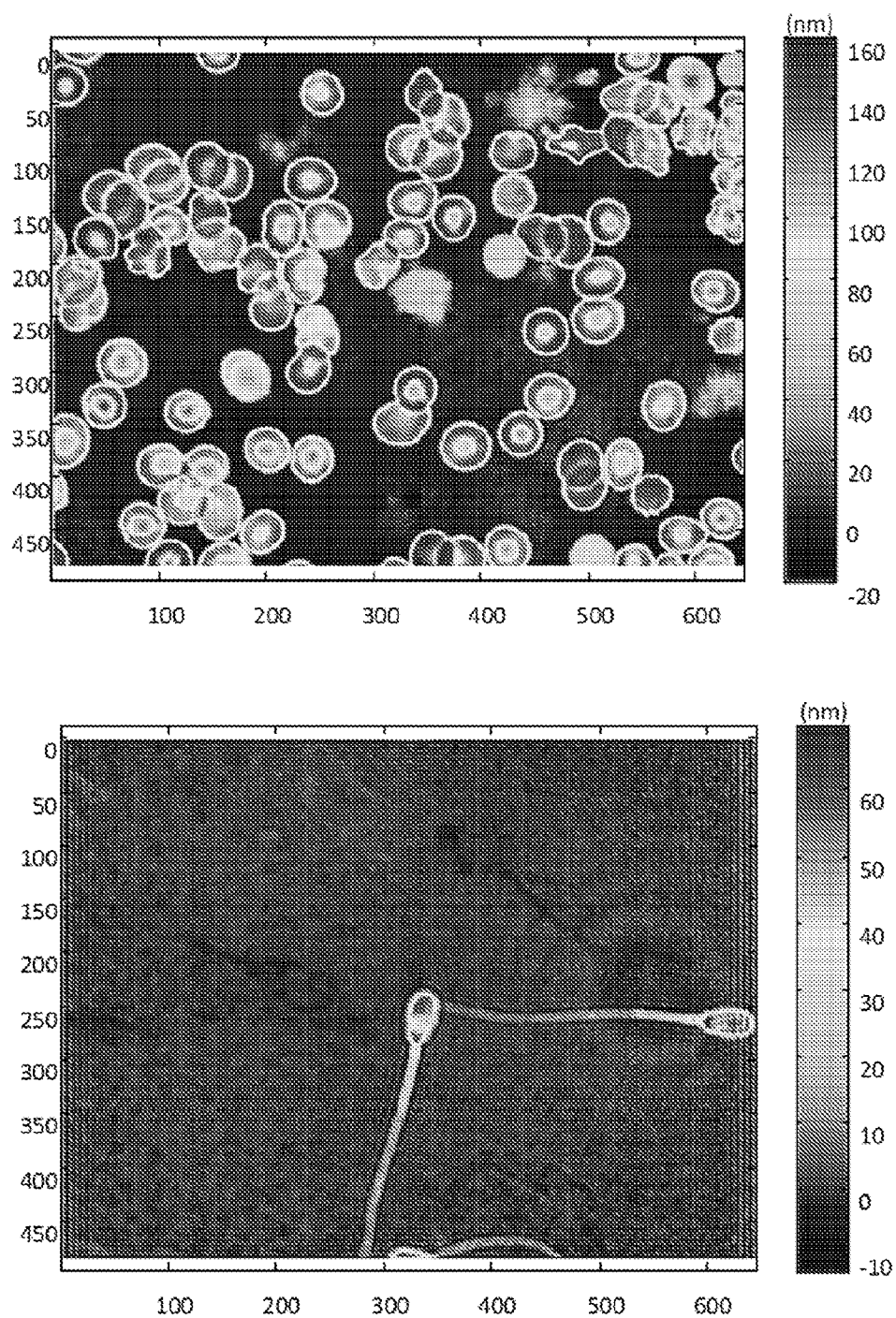
FIG. 6 are images illustrating examples of interference results using the interferometry system of FIG. 5, in accordance with various embodiments of the present disclosure.

Calculating L for every image point will produce the OPD image of the sample. FIG. 6 shows images of red blood cells (top) and sperm cells (bottom) acquired by the interferometry system 100 of FIG. 5.

In addition, the simulated sensitivity of the interferometry system 100 of FIG. 5 was examined using Eq. (3). FIGS. 7A-7D show the simulation results of calculated OPD and sensitivity of L from 0 to 50 µm. The four wavelengths were evenly spaced in the wavenumber domain (870 nm, 849.04 nm, 829.06 n, and 810 nm) with a bandwidth of about 15 nm for each position. The camera's well depth was 10000 with an interference fringe visibility of 0.9. The signal was assumed to be shot noise-limited. As seen in FIG. 7A, as the OPD L increases, the calculated L, which is wrapped, appears irregular for L below about 3 µm and then normal from about 3 µm to about 32 µm, and then repeats this pattern.

From the sensitivity plot of FIG. 7B, it becomes clear that the irregular pattern is a result of the large error below 3 µm. The error (standard deviation of L) is significantly reduced for the range 5-15 µm. Zoom-in views of FIGS. 7A and 7B from 7-15 µm are shown in FIGS. 7C and 7D. The wrapped pattern of calculated L is clear, indicating normal demodulation results. From FIG. 7D it can be seen that the sensitivity can reach at low as 1 nm.

The result indicates that for the setup of FIG. 5 and the indicated parameters, the best performance in terms of sensitivity is around 11 µm or other periodically appearing regions of L with minimal errors. The OPD modification as described in this disclosure can provide higher performance. This can achieved by inserting glass slides and coverslips (or other optical elements) in the sample and reference arms. The results in FIG. 6 were obtained after such modification. This is an example of the case where the intrinsic OPD of the Mach-Zehnder interferometer 106 is not optimal and the OPD modifying optics can be used to provide for optimized performance. The following example illustrates the improvement that can be achieved for quantitative phase imaging.

In many quantitative phase imaging (QPI) systems, phase shifting interferometry (PSI) is the enabling technique. The incorporation of the PSI techniques in conventional interferometers typically requires substantial customization of an otherwise conventional interferometer. A potential solution is wavelength shifting interferometry (WSI), a technique that removes the phase shifter and the associated need for interferometer modification. Instead, the phase shift is generated by a wavelength change of the light source. Traditional WSI techniques, such as discrete wavelength stepping and bucket integrating methods, are based on highly coherent tunable lasers. They are often associated with severe coherence artifacts, limiting their applications in high quality imaging of microscopic objects such as biological cells.

Low coherence wavelength shifting interferometry (LC-WSI) was implemented using the interferometry system 100 of FIG. 5. This broadband interferometric technique acquires signals for only a few spectral bands, which significantly improving imaging speed. A four-wavelength-band LC-WSI was used to characterize and demonstrate its performance for dynamic live cell imaging.

For the operation of LC-WSI, consider the interference between two fields $U_s$ and $U_r$, for example, the sample and reference fields. Intensity at the detector 109 can be expressed as a function of time delay z between the two fields:

$$I(\tau)=|U_s|^2+|U_r|^2+2|U_s||U_r|Re\{\Gamma(\tau)\}, \quad (4)$$

where $\Gamma(\tau)$ is the temporal correlation function. According to the generalized Wiener-Khintchin theorem, $\Gamma(\tau)$ is also the Fourier transform of the normalized source power spectrum density $S(\omega)$. Assuming this spectral shape is centered at $\omega_1$, a shifted spectrum can be defined as $S_1(\omega)=S(\omega+\omega_1)$, and $\Gamma(\tau)$ can be further given as:

$$\Gamma(\tau)=\int S_1(\omega-\Omega_1)e^{j\omega\tau}d\omega=e^{j\omega_1\tau}\int S_1(\omega)e^{j\omega\tau}d\omega=|\gamma_1(\tau)| \\ |e^{j\omega_1\tau+\xi_1(\tau)|}, \quad (5)$$

wherein $|\gamma_1(\tau)|$ and $\xi_1(\tau)$ are the magnitude and phase responses of the Fourier transform of $S_1(\omega)$, respectively. Note that $\omega_1\tau=k_1 L$, in which $k_1$ is the wavenumber corresponding to $\omega_1$ and L is the optical pathlength (OPL) difference (or OPD) between the two fields. Therefore in LC-WSI, for the n-th wavelength band with center wavenumber $k_n$, the detected intensity can be obtained by combining Eqs. (4) and (5):

$$I_n = |U_{sn}|^2 + |U_{rn}|^2 + 2|U_{sn}||U_{rn}||\gamma_n|\cos(k_n L + \xi_n) \quad (6)$$
$$= |U_{rn}|^2 \left[ \frac{|U_{sn}|^2}{|U_{rn}|^2} + 1 + 2\frac{|U_{sn}|}{|U_{rn}|}|\gamma_n|\cos(k_n L + \xi_n) \right],$$
$$n = 1, \ldots, N.$$

Equation (6) can be further simplified under several conditions: (1) the spectrum of each band is symmetric about its own $k_n$ so that $\xi_n=0$; (2) all N bands have a common spectral shape, which means $|\gamma_n(\tau)|$ are identical; (3) the intensity ratios $U_{sn}/U_{rn}$ are the same for all bands; (4) $k_n$ are evenly spaced by $\Delta k$. For the case of four-band LC-WSI (N=4), Eq. (6) can now be rewritten as:

$$\frac{I_n}{|U_{rn}|^2} = a + b\cos(k_0 L + \phi_n), n = 1, \ldots, 4, \text{ and} \quad (7)$$

$$\phi_n \left\{ -\frac{3}{2}\Delta kL, -\frac{1}{2}\Delta kL, \frac{1}{2}\Delta kL, \frac{3}{2}\Delta kL \right\},$$

where a and b are magnitude constants independent of n, $k_0=(k_1+k_4)/2$ is the center wavenumber of the full spectrum, and the additional phase terms $\phi_n$, although unknown because of L, are evenly spaced by $\Delta\phi=\Delta kL$. In the following, $I_n$ is used to represent the normalized intensity in the left-hand side of Eq. (7).

Eq. (7) is a special case of LC-WSI, but has the exact mathematical form that can be processed by the Carré algorithm designed for PSI. The OPL can thus be demodulated as:

$$L' = \frac{1}{k_0}\arctan\left\{ \frac{\sqrt{[3(I_2-I_3)-(I_1-I_4)](I_2-I_3+I_1-I_4)}}{(I_2+I_3-I_1+I_4) \times \text{sgn}(I_2-I_3)} \right\}, \quad (8)$$

which is a modified version of the original Carré equation with the addition of a signum function to resolve the quadrant ambiguity of the arctangent function. It produces the OPL image of the sample. When sample OPL is too large and thus wrapped, Eq. (8) can be followed by a routine 2D unwrapping process.

To demonstrate above principle, the Mach-Zehnder interferometer-based system of FIG. 5 coupled with the swept laser source was used. The OPL difference between the sample and reference arms was adjusted by placing cover-glass of different thicknesses in the reference arm. To acquire a phase image, the light source 103 (e.g., a Super-lum; BS-840-1) sweeps linearly in wavenumber from 878 nm to 816 nm and the camera 109 (e.g., an Allied Vision; Mako G030) is synchronized to capture four interferograms from the interferometer 106. Due to the continuous sweep and nontrivial exposure time (3 ms), the camera 109 integrated over four broad wavelength bands (about 14.5 nm each, centered at 869.65 nm, 853.45 nm, 837.85 nm and 822.80 nm), which were evenly spaced in wavenumber by $\Delta k=0.137$ μm$^{-1}$.

The low coherence operation of LC-WSI can minimize various types of coherence noises. The camera 109 operated at a rate of 250 fps, equivalent to an imaging rate of 62.5 Hz. Finally, the above conditions to use Eq. (7) were indeed met: (1) and (2) was satisfied with the swept source, which exhibits a substantially even spectrum response across the full sweeping range; (3) was typically true for transparent phase objects and determined only by the splitting ratio of the interferometer; and (4) was satisfied by the linear k sweep. Further, the intensity normalization in Eq. (7) can be implemented using the reference arm intensity obtained by blocking the sample arm.

Figure 8:
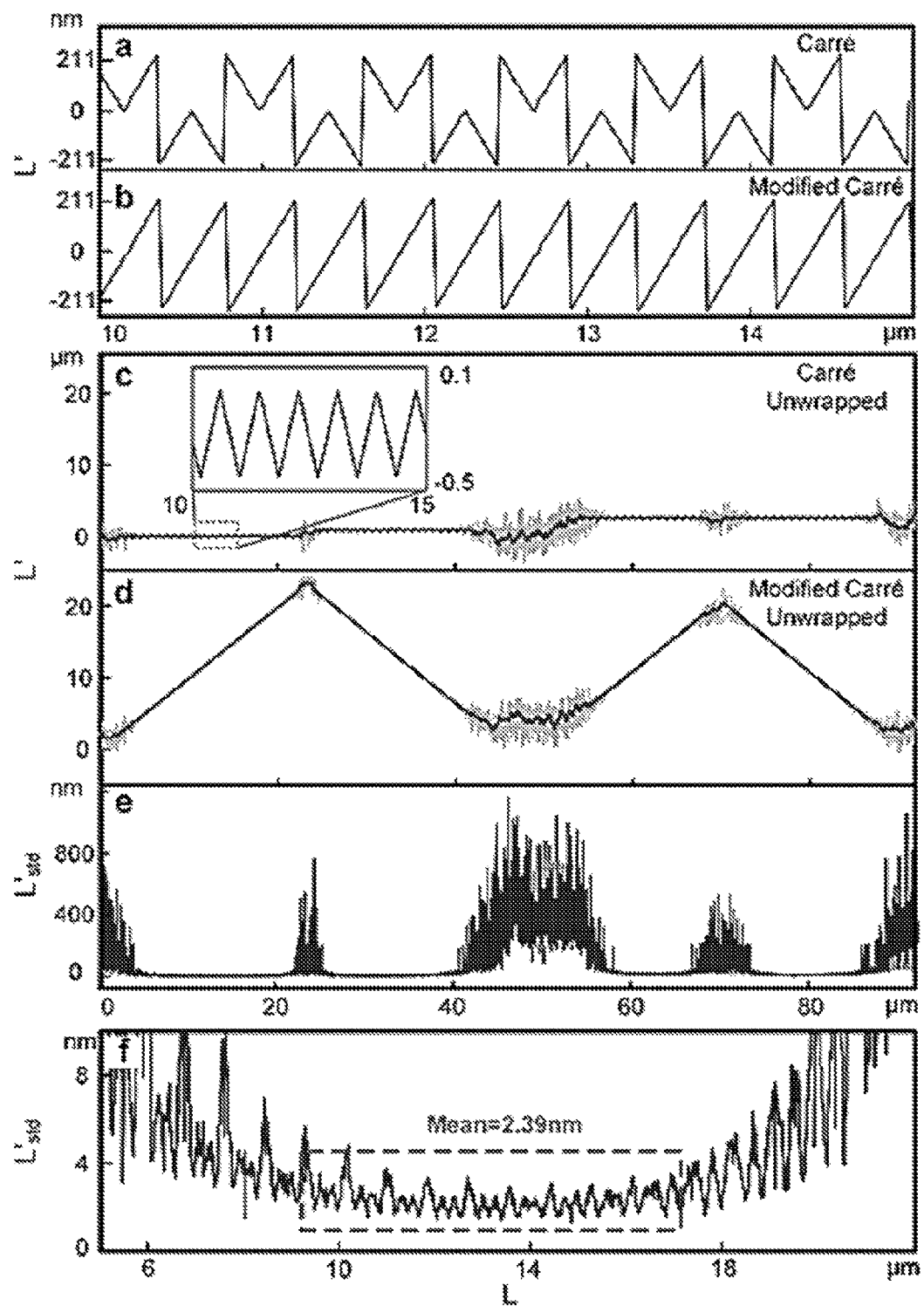

To demonstrate the behavior of the system, its performance was simulated. The same center wavelengths and bandwidths as in actual experiments were used. Signal strength and the associated shot noise were simulated based on the measured electron saturation capacity of the camera (9000 e$^-$). $I_n$ for a wide range of L were generated and processed respectively by both original Carré equation and the modified version in Eq. (8). FIG. 8 shows examples of the simulation results. Before unwrapping, the OPL obtained by the original Carré equation has the ambiguous "M" shape as shown in plot "a" of FIG. 8, whilst the corrected result has the typical sawtooth shape as shown in plot "b" of FIG. 8. The non-corrected OPL hence cannot be properly unwrapped, leading to severely limited linear range as shown in plot "c" of FIG. 8. In contrast, the unwrapped result from the modified algorithm shows much extended linear range as shown in plot "d" of FIG. 8. This is important for correctly quantifying samples with large OPL variations. Note that there are still periodic inflection points in plot "d" but the linear range is sufficiently large for most samples.

Further, to better visualize noise performance of the unwrapped L', the demodulation was repeated 100 times with random noises and the results plotted together as the shaded background in plots "c" and "d" of FIG. 8. It clearly shows that the demodulation error varies with L. Severe noise (error) is present around the inflection points. Hence it is advantageous to determine the optimal range of L to be used in the interferometer 106. To this end, the standard deviation (sensitivity) of the 100 groups of demodulated L' was calculated as shown in plot "e" of FIG. 8. As can be seen from the plot, regions around the inflection points are orders of magnitude noisier. Additionally, the sensitivity becomes worse beyond the coherence length of a single band (about 33 μm). Hence, the region between about 9-17 μm was selected as the optimal range for high-sensitivity OPL detection, with an average sensitivity of 2.39 nm as illustrated in plot "f" of FIG. 8. Note that the optimal value of L (about 14 μm) corresponds to a phase shift of about 1.92 rad ($\Delta kL$), which is consistent with previous reports of the optimal shift for Carré algorithm in the context of PSI. The sensitivity performance of the interferometry system 100 of FIG. 5 is limited by the relatively low saturation capacity of the camera 109, which affects signal-to-noise ratio. A larger saturation capacity would generate stronger signals and thus better sensitivity.

The ambiguity issue shown in plot "a" of FIG. 8 may be attributed to the quadrant ambiguity of the arctangent. Briefly, the wrapped phase $\phi=k_0 L$ was corrected with the addition or subtraction of $\pi$ or $2\pi$ based on the signs of sin $\phi$ and cos $\phi$, which are inferred from the signs of the following intensity combinations:

$$I_2 - I_3 = 2b\sin\phi \cdot \sin\frac{\Delta\phi}{2}, \quad (9)$$
$$I_2 + I_3 - (I_1 + I_4) = 2b\cos\phi \cdot \cos\frac{\Delta\phi}{2}\sin^2\frac{\Delta\phi}{2}.$$

In comparison, a simple sgn(·) term is added in Eq. (8) to achieve equivalent results. But Eq. (9) offers important insights into the cause of the inflection points in plot "d" of FIG. 8. When $\Delta\phi/2$ varies across $m\pi/2$, m=1, 2, 3 . . . , $\sin(\Delta\phi/2)$ or $\cos(\Delta\phi/2)$ in Eq. (9) will experience a change of sign, affecting the sign judgment for sin($\phi$) and cos($\phi$). These sign-inverting points correspond to L=m$\pi$/1 k, precisely where the inflection points are located in plot "d." Nevertheless, this effect does not affect the signal processing of the approach because the optimal linear range is within the first inflection point.

Figure 9:
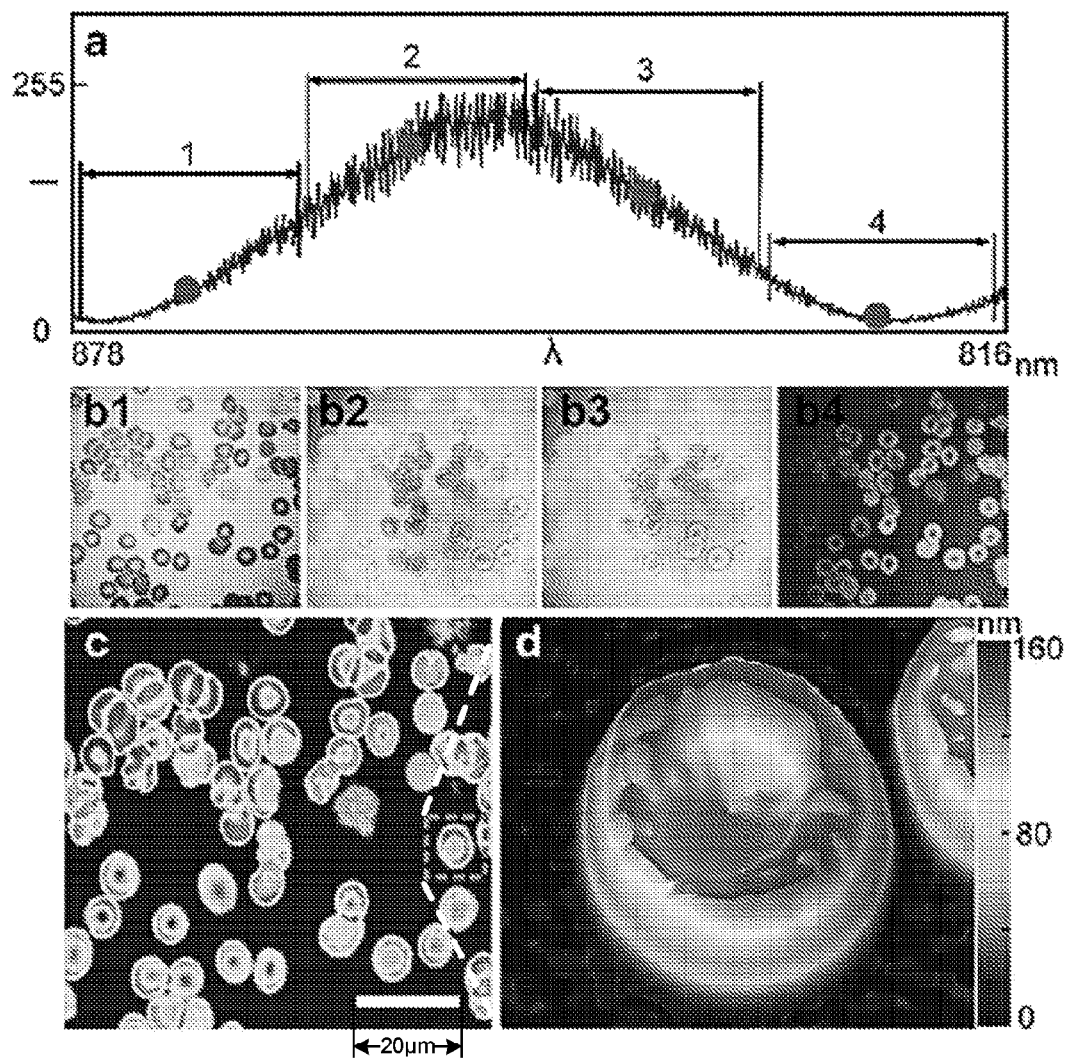
FIGS. 9, 10 and 11 illustrate test results for human red blood cells (RBCs), a lens tissue sample, and boar semen utilizing the interferometry system of FIG. 5, in accordance with various embodiments of the present disclosure.

The feasibility of LC-WSI for quantitative phase imaging was demonstrated using human red blood cells (RBCs). A drop of whole blood was sandwiched by a No. 1.5 coverslip and a microscope slide and placed on the sample stage of the interferometer 106. As a first step, the OPL difference between the two arms was ensured to be within the optimal range. This was achieved by taking advantage of the swept laser source in the light source 103. Before the four-band experiments, the laser was slowly swept and interferograms recorded at a large number of wavenumber positions and with narrow linewidth. Plot "a" of FIG. 9 shows the spectral intensity across the full sweep range when using slow and narrow-linewidth scanning. As can be seen, the sample-reference interference varies with wavelength $\lambda$ as expected. From the positions of the minima, the OPL difference can be determined as 2$\pi$/k$_{2\ min}$−k$_{1\ min}$)=13.58 µm, well within the optimal range. This verification step is a one-time procedure. Next, the source and camera were switched to four-band acquisition mode to capture the LC-WSI interferograms. The interferograms of RBCs for the four bands (1-4) are shown as images "b1" through "b4" of FIG. 9, respectively, with their corresponding center wavenumbers indicated as dots in plot "a." A processed OPL image for the RBCs is shown in image "c" of FIG. 9, with a 3D rendering of the indicated RBC shown in image "d."

Figure 10:
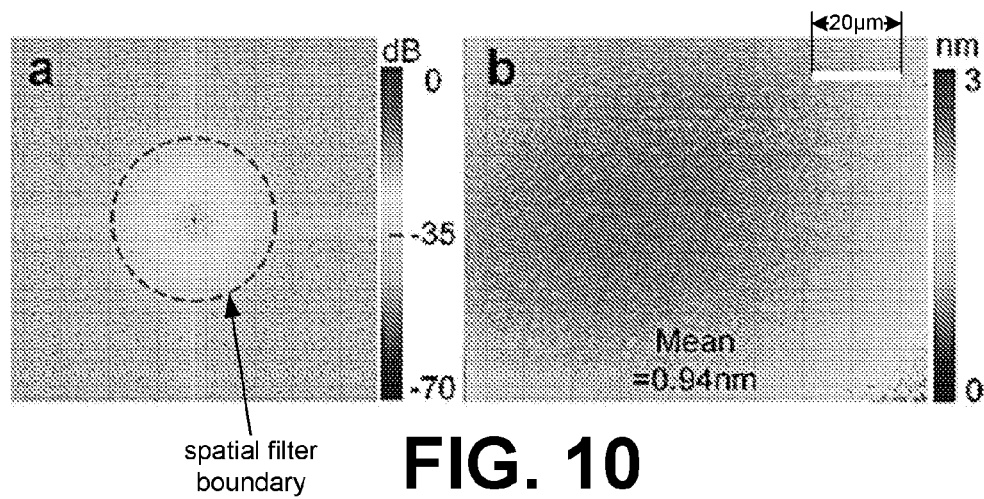

Next, the system sensitivity was characterized with a water-filled, blank sample chamber. Temporal measurement sensitivity was quantified by acquiring 100 consecutive OPL images of this sample and calculating the standard deviation for each image pixel of the recorded interferometer data. The average sensitivity across the field of view (FOV) was 2.33 nm, in excellent agreement with the simulated result. This sensitivity can be further improved by spatial filtering in the Fourier domain to remove out-of-band noise since the camera oversamples the recorded image. The spatial-frequency passband was determined by imaging a piece of lens tissue, whose fine structures fill the bandwidth. FIG. 10 illustrates the spatial frequency component of the lens tissue sample. Plot "a" shows the 2D Fourier transform of the image with the circle indicating the spatial filter boundary. After filtering, the mean value of the temporal sensitivity is improved to below 1 nm as shown in plot "b" of FIG. 10.

Figure 11:
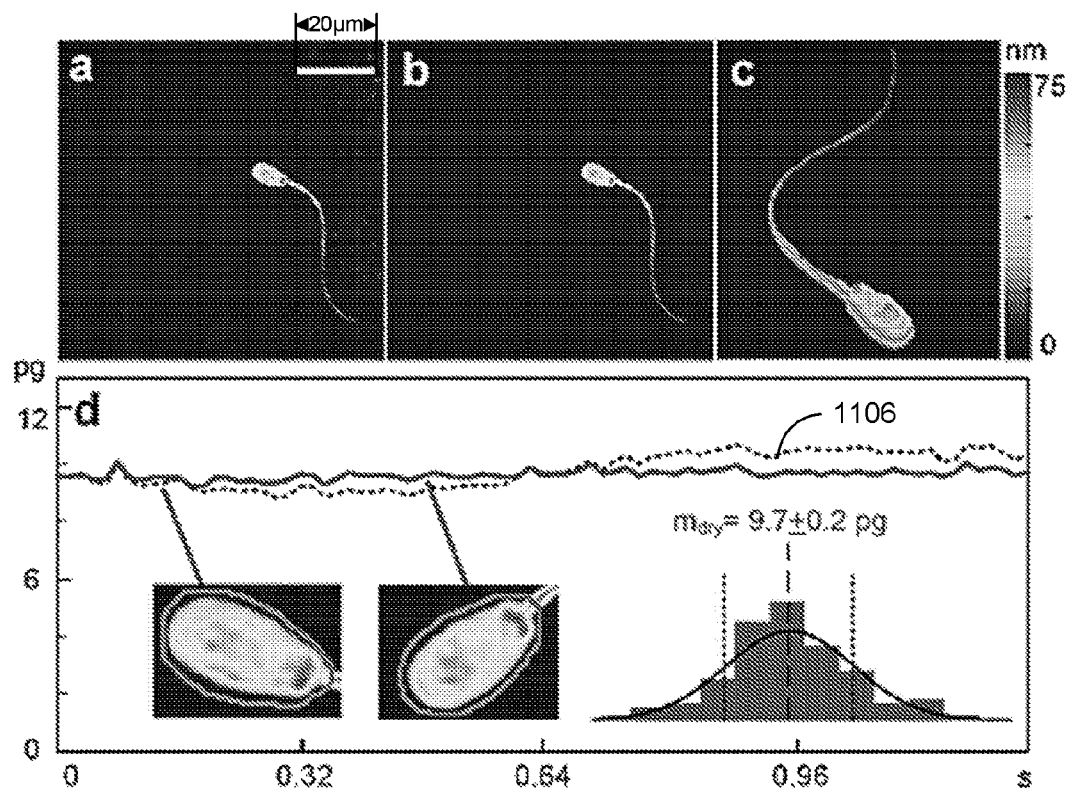

With a high acquisition rate and high sensitivity, the interferometry system 100 is capable of imaging dynamic biological specimens such as sperm cells. It has been reported that sperm morphology is highly correlated to its quality. For example, with intracytoplasmic morphologically selected sperm injection, the pregnancy rates of in vitro fertilization can be improved. For experiment validation, boar semen was collected, extended and diluted with sperm wash medium. FIG. 11 includes images "a" through "c" of a boar sperm cell. The OPL image of the live and mobile sperm is shown in image "a" (before fixed pattern removal).

An application of OPL images is to calculate the dry mass and/or volume of the cell. The conversion between OPL values and the total dry mass of cell within an enclosed area s can be expressed as:

$$m_{dry} = \iint \frac{L}{\chi} dS, \quad (10)$$

where $\chi$≈0.18 cm$^3$/g is a conversion coefficient. Since the sperm cell is in constant motion, the integral accuracy will be affected by the spatial variation of background, which is evident in image "a" of FIG. 11. To remove this fixed pattern, temporal averaging of the OPL over the entire recording can be performed for each pixel, but excluding the moments when the pixel is occupied by the sperm cell. Since each pixel has such sperm-free periods due to the sperm's fast motion, an accurate background can be obtained and removed subsequently. Image "b" shows a cleaner OPL image after the fixed background removal and image "c" is a 3D representation of the cell.

The real-time dry mass can be calculated with an automatic edge-detection based algorithm to generate a mask for the sperm head as illustrated in plot "d" of FIG. 11. The dynamic dry mass curve 1103 after background correction shows considerably less variation than the uncorrected curve 1106. The mean value of 9.7 pg is generally in line with previous reports of boar semen, as well as other species such as bull and ram. The standard deviation of the dry mass curve is 0.2 pg, believed to be mainly due to mask inaccuracy. The ±2% full-scale error is fairly accurate, considering the motion of the cell and its small mass as compared to other cells types, such as HeLa cells that are typically several hundreds of picograms.

The LC-WSI technique and its application to dynamic QPI has been demonstrated using the interferometry system 100 of FIG. 5. Phase shift was accomplished in the wavelength domain instead of the phase domain, thus shifting the work from a phase shifter to the light source 103. This switch minimizes system customization, potentially opening doors to integrating multiple quantitative imaging techniques. Further, the low coherence operation minimizes common coherent artifacts and enables high quality imaging of microscopic objects. The dynamic dry mass measurement confirmed its high sensitivity, which may be further improved with upgraded hardware and shows great potential in precision quantification of live cells.

The disclosed techniques can be easily implemented on commercial microscopes. As shown in FIGS. 2A and 2B, a DIC microscope can be modified using one or more birefringent crystal(s) 203 as the OPD modifying optics 112. OPD modifying optics 112 comprising the birefringent crystal(s) 203 can be provided as an attachable add-on unit configured to be coupled to the interferometer (or microscope) 106. The detector 109 can also be integrated with the OPD modifying optics 112 to provide single add-on unit that can be coupled to the output of the interferometer 106. Additionally, the add-on unit can allow the optics configuration to change between properly oriented birefringent crystals 203 and/or polarizers 206, and thus enable quantitative DIC through multi-wavelength interferometry.

Figure 12:
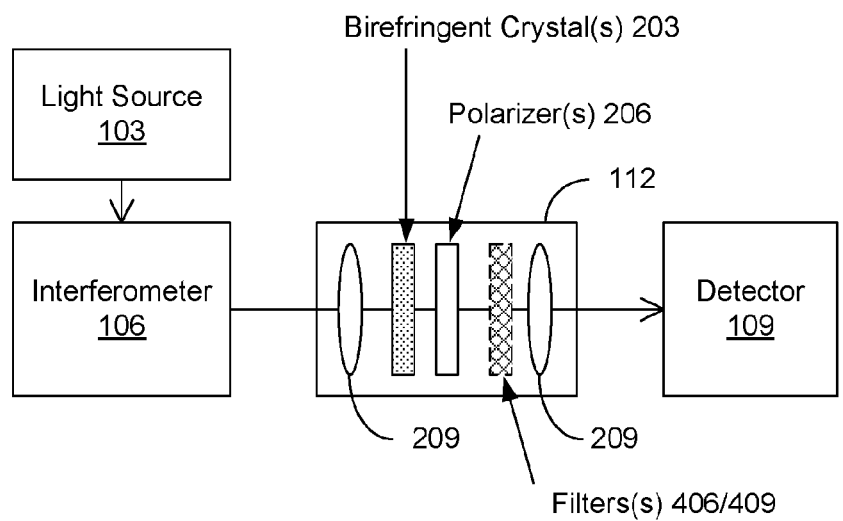
FIGS. 12 and 13 illustrate variations to the modifying optics of the interferometry systems of FIGS. 2B and 3, in accordance with various embodiments of the present disclosure.

As discussed with respect to FIGS. 4A-4C, the light source 103 can comprise a broadband light source 403 with bandpass filter(s) 406 or a pixelated filter mask 409, multiple LEDs and/or lasers 412, or tunable LEDs and/or lasers 412 to provide the different wavelengths (or wavelength bands) $\lambda_i$. In some implementations, the bandpass filter(s) 406 or pixelated filter mask 409 can be included with the OPD modifying optics 112 in the add-on unit as illustrated in FIG. 12. The filter(s) 406/409 can be controlled to allow for the different wavelengths to be recorded by the detector (e.g., a camera) 109. For example, by switching between different bandpass filters 406, the add-on unit can enable a camera to record interferometer data at multiple different wavelengths $\lambda_i$. As a result, the as add-on unit can be configured to modify both OPD and wavelength.

Figure 13:
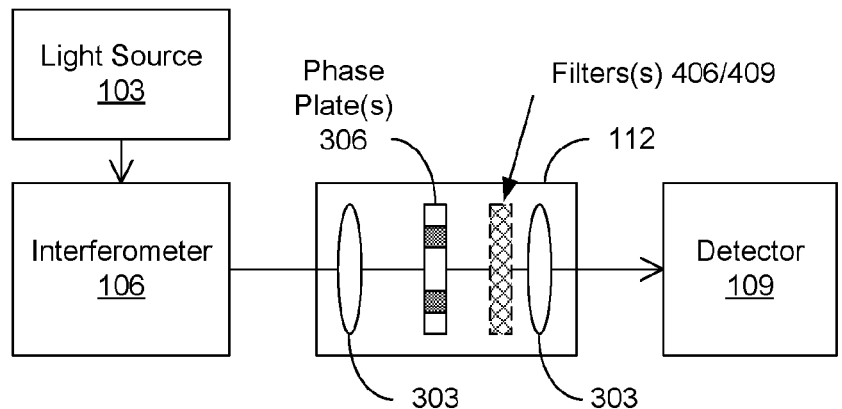

FIG. 3 shows a PhC microscope with the OPD modifying optics 112 including the relay lenses 303 and phase plate 306 added to enable quantitative PhC imaging. As previously discussed, the OPD modifying optics 112 can be made into an attachable add-on unit for coupling to the interferometer (or microscope) 106. In the example of FIG. 3, the phase plate 306 is placed at the Fourier plane of the output image of the microscope, which may or may not include the phase-objectives as shown. Other configurations are also possible that allow the OPD modifying optics 112 to perform the desired function. For example, the add-on unit can allow the optics configuration to change between phase plate(s) 306, and thus enable quantitative PhC through multi-wavelength interferometry. In addition to the OPD modifying optics 112, the add-on unit can include the bandpass filter(s) 406 or pixelated filter mask 409 as shown in FIG. 13. The filter(s) 406/409 can be controlled to allow for the different wavelengths to be recorded by the detector (e.g., a camera) 109. In some implementations, the detector 109 can also be combined in the add-on unit as has been discussed. As a result, the as add-on unit can be configured to modify both OPD and wavelength.

Figure 14:
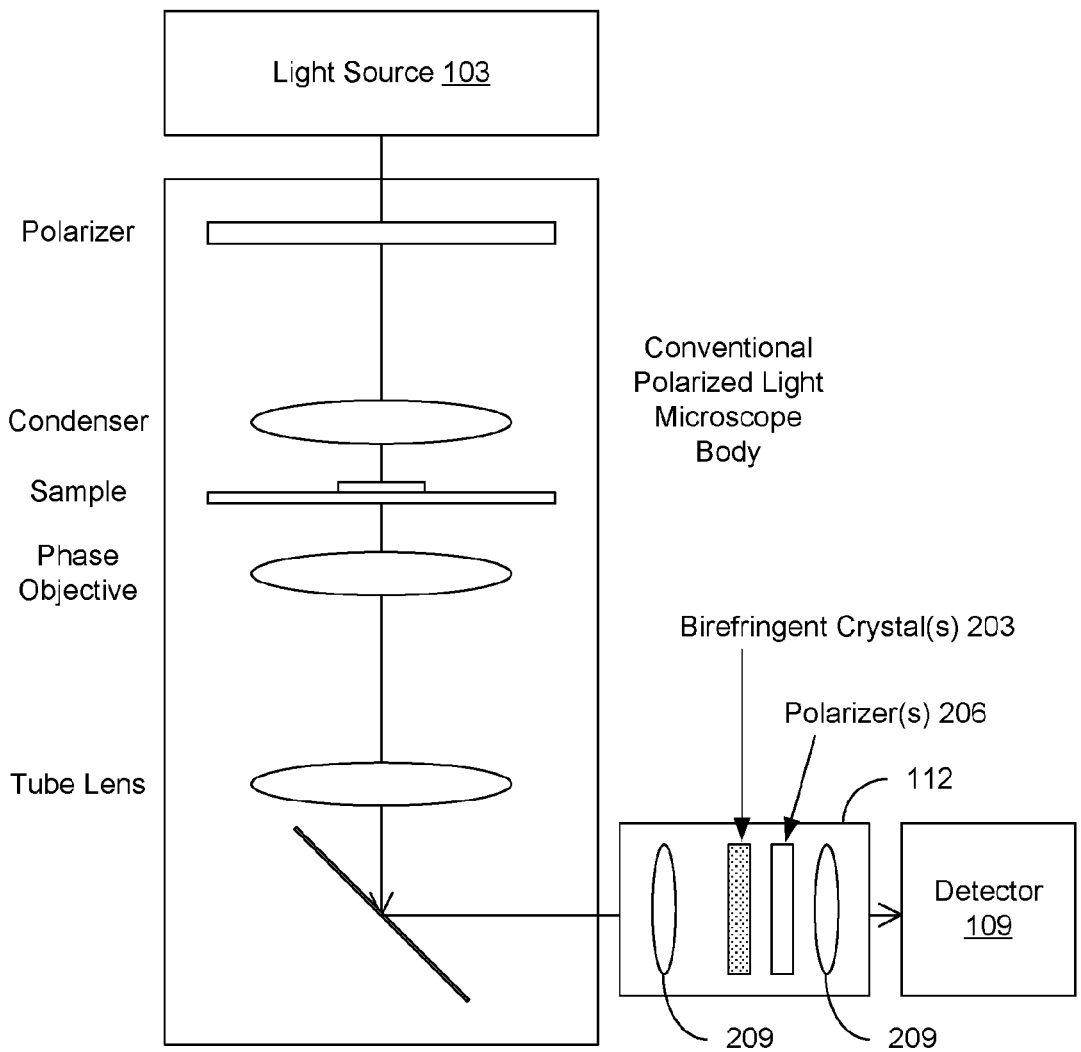
FIG. 14 illustrates an example of a conventional microscope including the modifying optics of the interferometry system of FIG. 2B, in accordance with various embodiments of the present disclosure.

The OPD modifying optics 112 can also be utilized with conventional microscope body to provide quantitative polarized light (birefringence) imaging through multi-wavelength interferometry as illustrated in FIG. 14. As discussed, the modifying optics 112 can be provided as an add-on unit that can be coupled to the microscope. The add-on unit can allow the optics configuration to change between properly oriented birefringent crystals 203 and/or polarizers 206, and thus enable quantitative polarized light imaging. As in FIG. 12, the bandpass filter(s) 406 or pixelated filter mask 409 can be included with the OPD modifying optics 112 in the add-on unit, and controlled to allow for the different wavelengths to be recorded by the detector (e.g., a camera) 109.

The light source 103 can also be configured as an add-on unit that can be attached or coupled to the interferometer (or microscope) 106. The light source 103 can include a broadband light source 403, multiple LEDs and/or lasers 412, or tunable LEDs and/or lasers 412 to provide the different wavelengths (or wavelength bands) $\lambda_i$. The add-on unit can also include bandpass filter(s) 406 for the broadband source 403 as previously discussed. In some embodiments, the light source 103 can be included in a common add-on unit with the OPD modifying optics 112. The light source 103 and detector 109 may also be provided in a common device such as, e.g., a cellphone or tablet. For example, a smartphone can provide a broadband light source 403 for the light source 103 and a camera as the detector 109. The add-on unit can be configured to allow the smartphone, cellphone or tablet to be attached and aligned with the optics to record the interferometer data from the output of the interferometer (or microscope) 106 and/or direct the light from the broadband light source 403 to the interferometer (or microscope) 106.

Next, an interferometry system 100 using a common-path, reflective interferometer configuration including OPD modifying optics 112 is presented, as illustrated in FIG. 15A. Multiple modalities can be integrated into a single system 100 for quantitative birefringence, DIC and/or phase imaging. The system can address issues of system birefringence background and birefringence-induced DIC/phase distortion, making it possible to achieve improved accuracy.

The interferometry system 100 of FIG. 15A includes a broadband superluminescent diode or SLD 1503 (e.g., a Superlum; 837 nm, FWHM 54 nm) as the light source 103. A linear polarizer 1506 and a birefringent crystal 1509 (e.g., LiNbO$_3$, thickness 2.75 mm) provide OPD modifying optics 112 can be oriented at a pre-determined angle to introduce polarization mixing. For quantitative DIC imaging, a Nomarski prism 1512 can be inserted at the back of the microscope objective 1515 (e.g., a Nikon; 40×, 0.75 NA), splitting o- and e-waves by a small angle that leads to a lateral shear on the sample. The return light will be modified by the crystal 1509 and filtered by the polarizer 1506 while passing through the system 100 once again, and finally be collected by the single-mode fiber. The spectral interference carrying intensity and phase information is then detected by a custom spectrometer or SPM 1518. Two galvanometers, separated by a 4-f system, provide two-dimensional point scanning of the specimen. For quantitative birefringence imaging, the Nomarski prism 1512 is simply removed to eliminate the shear.

Signal propagation through the system 100 can be analyzed with Jones calculus using the schematic representation of FIG. 15B. For convenience, the transmission direction of the polarizer 1506 is chosen to be the x-axis. The slow axes of the birefringent crystal 1509 and the sample orient at angles $\alpha$ and $\beta$ relative to the x-axis, respectively. For non-birefringent samples, $\beta$ can be any angle since they are optically isotropic and in fact, it will be eliminated from the formula. System birefringence, arising from the residual birefringence of various system optics, can be treated as a lumped element with its slow axis oriented at angle $\varphi$.

First analyze birefringence imaging, i.e. without the Nomarski prism 1512 in FIG. 15B. Assuming the normalized Jones vector after the polarizer 1506 is $[1\ 0]^T$, the field after a double-pass transmission through the entire system 100 can be obtained by:

$$E_O = [1\ 0]R(-\alpha)T(\theta_C)R(\alpha - \varphi)T(\theta_B)R(\varphi - \beta) \quad (11)$$
$$T(2\theta_S)R(\beta - \varphi)T(\theta_B)R(\varphi - \alpha)T(\theta_C)R(\alpha)\begin{bmatrix}1\\0\end{bmatrix},$$

where R is the rotation matrix and T is the transmission matrix for polarizing components, as in:

$$R(\varphi) = \begin{bmatrix} \cos\varphi & \sin\varphi \\ -\sin\varphi & \cos\varphi \end{bmatrix} \text{ and } T(\theta) = \begin{bmatrix} 1 & 0 \\ 0 & e^{j\theta} \end{bmatrix}. \quad (12)$$

Additionally, $\theta_C(k)=kL_C(x,y)$, $\theta_B(k)=kL_B(x,y)$, and $\theta_S(k)=kL_S(x,y)$, where k is the wavenumber, $L_C$ is the optical pathlength (OPL) retardation of the crystal retarder, and $L_B(x,y)$ and $L_S(x,y)$ stand for the retardation of system birefringence and sample birefringence at (x,y), respectively.

Since both $L_B$ and $L_S$ in live cell imaging are typically small compared to the wavelength, small angle approximation is valid for $\theta_B$ and $\theta_S$. With Eqs. (11) and (12), the detected interference spectrum can be shown to be:

$$I=I_0(k)|E_0|^2 = I_{DC}(k) + [I_{1f}(k)+c.c.] + [I_{2f}(k)+c.c.], \quad (13)$$

where $I_0(k)$ is the spectrum envelope, $$I_{DC}(k) = I_0(k)[\cos^4\alpha + \sin^4\alpha], \quad (14)$$
$$I_{1f}(k) = \frac{1}{4}\sin 4\alpha I_0(k)[jA_S(k) + jA_B(k)]e^{jkL_C},$$
$$I_{2f}(k) = \frac{1}{4}\sin^2 2\alpha I_0(k)[jB_S(k) + jB_B(k) + 1]e^{j2kL_C},$$

and c. c. denotes the complex conjugate of the corresponding terms. Eq. (4) clearly indicates that $I_{1f}$ and $I_{2f}$ are two interference terms in the detected spectrum with carriers of $e^{jkL_C}e^{jkL_C}$ and $e^{j2kL_C}$, generated by the large OPL retardation of the crystal retarder. In addition, sample and system birefringence parameters are simultaneously modulated onto the complex amplitude of the carrier waves, but are found to be decoupled from each other, as seen in the following intermediate parameters:

$$\begin{cases} A_S(k) = 2\theta_S(k)\sin 2(\alpha - \beta) \\ B_S(k) = 2\theta_S(k)\cos 2(\alpha - \beta) \end{cases}, \quad (15)$$
$$\begin{cases} A_B(k) = 2\theta_B(k)\sin 2(\alpha - \varphi) \\ B_B(k) = 2\theta_B(k)\cos 2(\alpha - \varphi) \end{cases}.$$

Based on above derivation, we can perform a system birefringence calibration without sample to acquire $A_B$ and $B_B$, and remove them from sample measurement to obtain $A_S$ and $B_S$. only for the determination of sample birefringence parameters.

As for the choice of a, a wide range of angles may be used except when $\sin 4\alpha=0$ or $\sin^2 2\alpha=0$ in Eq. (14). A detailed sensitivity analysis and experimental validation regarding a for spectral multiplexing interferometry based birefringence measurement can be found in "Quantitative polarized light microscopy using spectral multiplexing interferometry" by C. Li, and Y. Zhu (Opt. Lett., 40(11), 2622-2625, 2015)., which is hereby incorporated by reference in its entirety. Since here $I_{DC}(k)$ is sample independent with small angle approximation, we now set $\alpha$ at 31.7° so that $\sin 4\alpha = \sin^2 2\alpha$, which leads to identical coefficients for both interference terms in Eq. (14). Thus the sensitivity of both sample birefringence retardation and azimuth angle will be independent of sample birefringence orientation.

With knowledge of $\alpha$ f, $I_0(k)$ can also be determined from $I_{DC}$. The signal demodulation hence involves bandpass filtering of $I_{1f}$ and $I_{2f}$, normalizing them using $\alpha$ and $I_0$, and frequency downshifting. With the carrier waves obtained from the interference spectra without sample, $I_{1f}$ and $I_{2f}$ can be downshifted to baseband for extracting $A_S$ and $B_S$ from the imaginary part of the complex amplitude after removing $A_B$ and $B_B$. Sample birefringence is therefore:

$$L_S = avg\left[\sqrt{A_S(k)^2 + B_S(k)^2} \Big/ 2k\right], \quad (16)$$
$$\beta = avg\left[-\frac{1}{2}\arctan\frac{A_S(k)}{B_S(k)} + \alpha\right].$$

where avg(·) denotes averaging over the range of k. This process allows the background-free measurement of $L_S$ and $\beta$ from one single spectrum.

To demonstrate the birefringence imaging capability, Plasmodium falciparum-infected human RBCs was chosen. During their asexual replication cycle within RBCs, malaria parasites consume host cell hemoglobin and produce birefringent hemozoin crystals. For imaging, an in vitro culture of P. falciparum-infected erythrocytes was fixed with 0.1% glutaraldehyde in phosphate buffered saline (PBS). Fixed parasites were then washed with PBS to remove glutaraldehyde prior to imaging.

Figure 16:
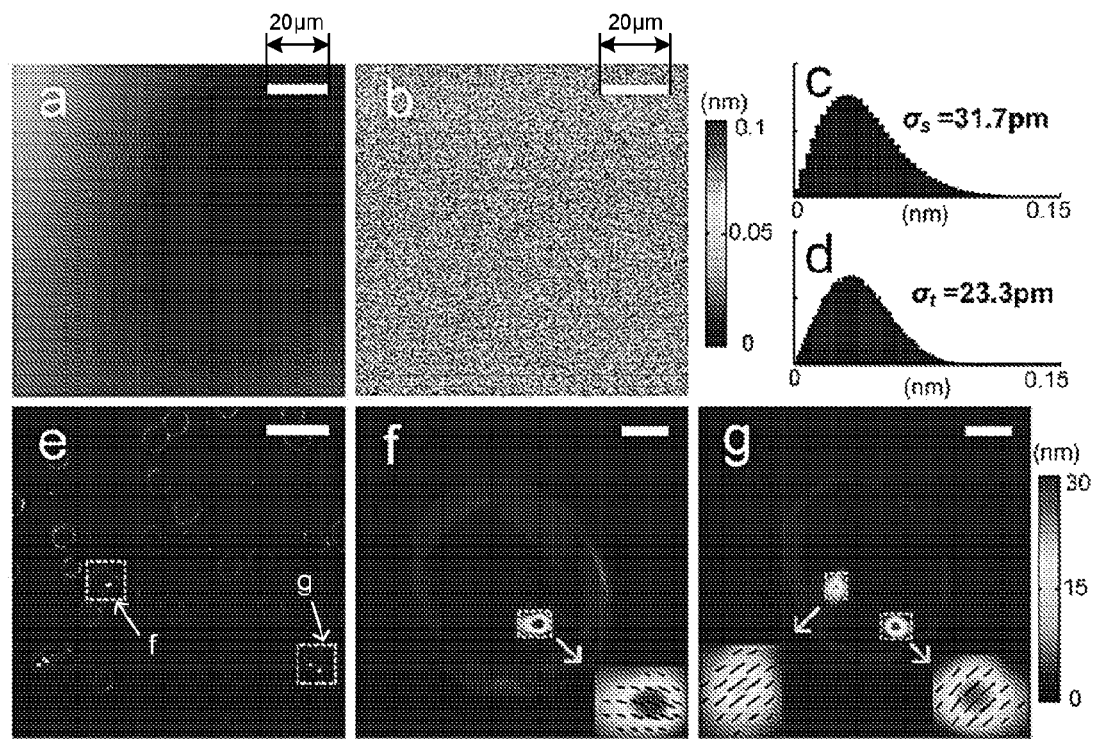
FIGS. 16, 17 and 18 illustrate test results for human red blood cells (RBCs) utilizing the interferometry system of FIGS. 15A and 15B, in accordance with various embodiments of the present disclosure.

To quantify RBC birefringence, system birefringence background is first calibrated. An example of the system birefringence background is illustrated in FIG. 16. Plot "a" of FIG. 16 is a magnitude map, with an averaged retardation of 4.12 nm over the field of view. The spatial and temporal sensitivity for birefringence measurement are also calibrated with a gold mirror. The spatial sensitivity of the birefringence retardation is shown in plot "b" of FIG. 16. Since $A_S$ and $B_S$ are both Gaussian random variables, with the knowledge of Eq. (16), the birefringence retardation $L_S$, as a positive-valued random variable, is expected to have a Raleigh distribution. Plot "c" shows the birefringence retardation histogram of the full field in plot "b" and plot "d" shows the temporal sensitivity of the birefringence retardation. The calibration results in plots "c" and "d" verify the theoretical analysis, with $\sigma_s=31.7$ pm for full field spatial sensitivity and $\sigma_t=23.3$ pm for single spot temporal sensitivity, respectively.

Image "e" shows the birefringence retardation image of the P. falciparum-infected human RBCs after background subtraction based on Eqs. (14) and (15), with a scale bar of 20 μm. Among the imaged cells, the infected ones can be clearly identified by the hemozoin crystals inside. The magnitude of hemozoin birefringence retardation in the infected RBCs is about 30 nm and is much stronger than the birefringence of the cell body, which is believed to be originated largely from local heterogeneity. Enlarged birefringence retardation images of two single infected RBCs from image "e" are depicted in "f" and "g" with a scale bar of 2 μm. The slow axis orientation is illustrated in the inset images, where the line direction and length indicate the local optical axes orientation and birefringence retardation of the hemozoin crystals. One and two crystals are revealed respectively with the birefringence slow axis distributed uniformly for each crystal. The presence of two crystals likely indicates that this red cell has been invaded by two parasites.

In addition to single-shot birefringence imaging, the same setup can also be used for quantitative DIC imaging. Note that as shown in FIG. 15B, the direction of the inserted Nomarski prism 1512 should be parallel to the axes of the crystal retarder 1509. With the Nomarski prism 1512 splitting the incident beam into two by a small angle, the n- and e-waves will experience different polarization mixing in the specimen. The Jones analysis now becomes:

$$E_O = [1 \; 0]R(-\alpha)T(\theta_C)R(\alpha - \varphi)T(\theta_B)R(\varphi - \alpha). \quad (17)$$
$$\left[R(\alpha-\beta)T_{S1}R(\beta-\alpha)\begin{pmatrix}1 & 0\\ 0 & 0\end{pmatrix} + R(\alpha-\beta)T_{S2}R(\beta-\alpha)\begin{pmatrix}0 & 0\\ 0 & 1\end{pmatrix}\right],$$
$$\cdot R(\alpha-\varphi)T(\theta_B)R(\varphi-\alpha)T(\theta_C)R(\alpha)\begin{bmatrix}1\\0\end{bmatrix}$$

where $T_{s1}$ and $T_{s2}$ denote the respective transmission matrices for sample retardation for the two waves at their corresponding positions, $$T_{S1} = \begin{pmatrix} e^{j2kL_{1e}} & 0 \\ 0 & e^{j2kL_{1o}} \end{pmatrix} \text{ and} \quad (18)$$
$$T_{S2} = \begin{pmatrix} e^{j2kL_{2e}} & 0 \\ 0 & e^{j2kL_{2o}} \end{pmatrix}.$$

Similar to birefringence imaging, Eq. (17) can be expanded and the second interference term (2f) can be obtained as:

$$I_{2f} = \frac{1}{4}\sin^2 2\alpha I_0(k)e^{jk(L_{2e}-L_{1e}+L_{2o}-L_{1o})}[jB_S(k) + jB_B(k) + 1]e^{j2kL_C}. \quad (19)$$

For non-birefringent samples, the o- and e-waves are identical. When system birefringence is also ignored, Eq. (9) can be simplified to:

$$I_{2f} = \frac{1}{4}\sin^2 2\alpha I_0(k) e^{j2k(L_2-L_1)} e^{j2kL_C}, \quad (20)$$

which, as expected, is essentially identical to the previously reported expression. The quantitative DIC signal is simply the phase of the downshifted $I_{2f}$.

In contrast, for birefringent samples, the OPL gradient term in $I_{2f}$ is $e^{jk(L_{2e}-L_{1e}+L_{2o}-L_{1o})}$. It can be interpreted as the average OPL gradients of o- and e-waves. Also, there exists an additional complex term, $[jB_S(k)+jB_B(k)+1]$, which is determined by system and sample birefringence. This birefringence-induced coefficient thus introduces a phase error in OPL gradient measurement. Fortunately, it is identical to the term in $I_{2f}$ in Eq. (14), and is therefore already known from birefringence measurement. As a result, the birefringence-induced phase error can be corrected using the birefringence data.

Figure 17:
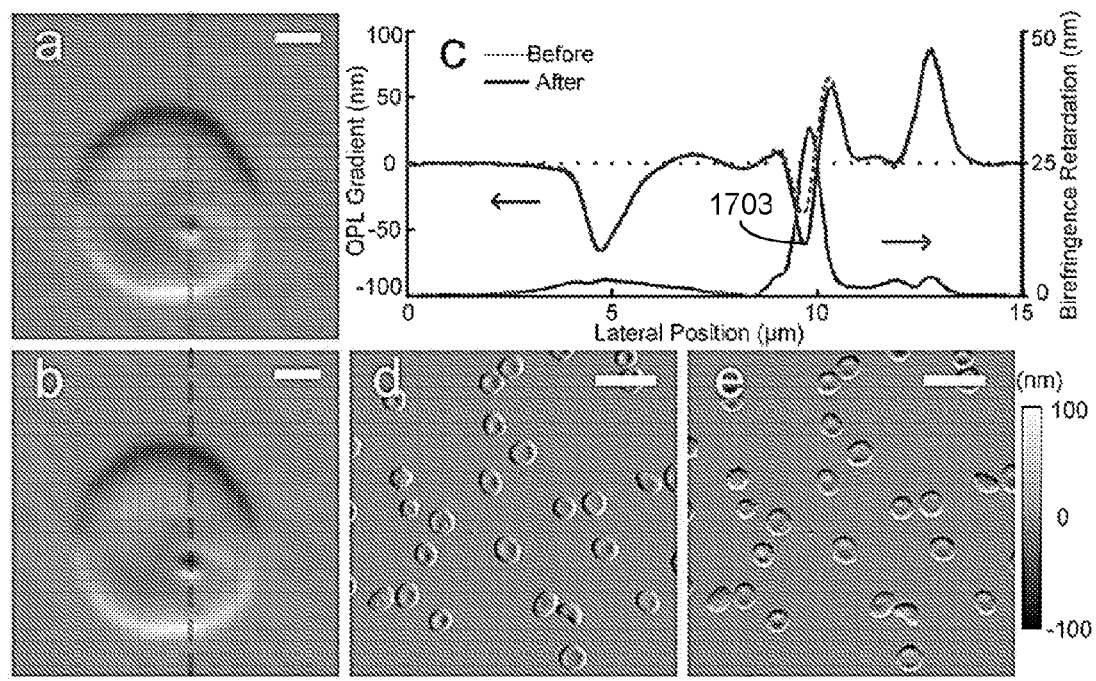

Referring to FIG. 17, shown are DIC gradient results of an infected RBC. Images "a" and "b" show the OPL gradient images before and after the birefringence correction, respectively. In plot "c" of FIG. 17, closer examination of the DIC data reveals a clear difference at the position of hemozoin crystal. The corrected positive and negative DIC peaks (curve 1703) become symmetric about zero, which is a typical indication of birefringence-free DIC signal. This confirms that the phase error from sample anisotropy has been removed effectively. Also observe that, for the low-birefringence areas away from the hemozoin, the OPL gradient data before and after correction are still in good agreement. The OPL gradient images of the infected RBCs after correction are shown in images "d" and "e" for the horizontal and vertical shear directions, respectively.

Figure 18:
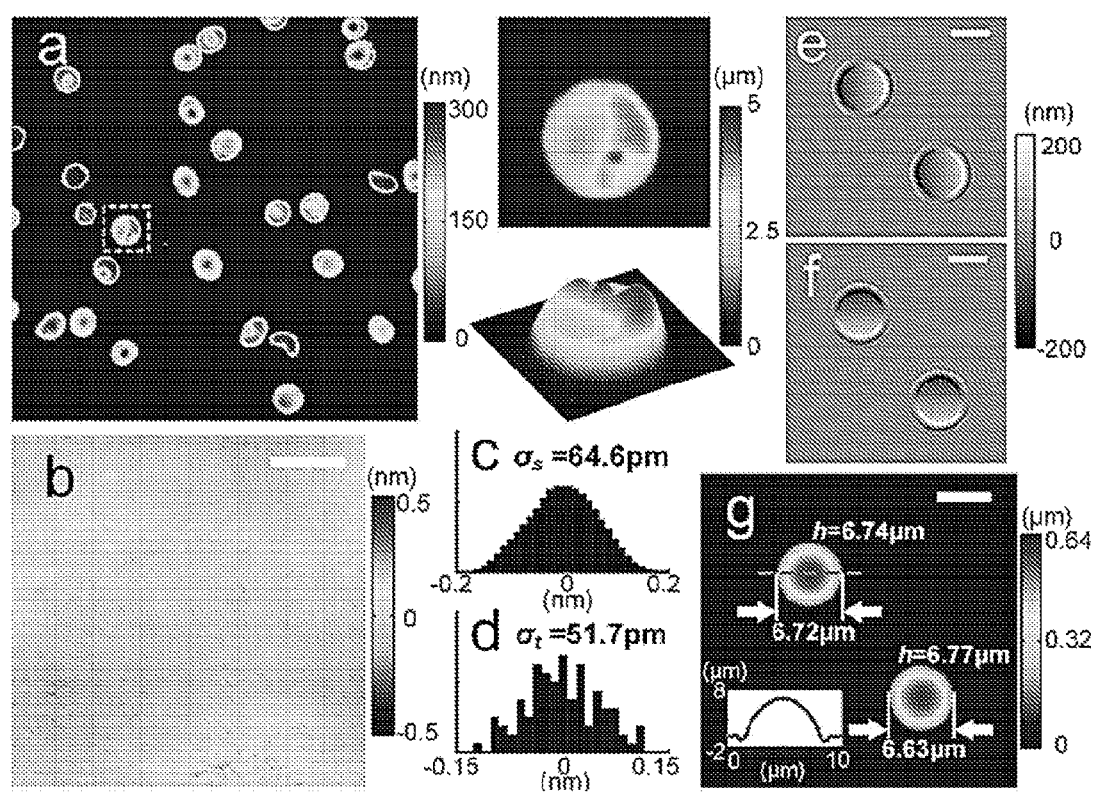

Further, with these two directional OPL gradient images and 2D phase reconstruction algorithms, quantitative phase image of the sample can be obtained, as shown in FIG. 18. Image "a" is the quantitative phase image based on the 2D integration of images "d" and "e" in FIG. 17. The process involves image registration between the two gradient images and FFT-based 2D phase integration. The enlarged 2D optical thickness image and the 3D representation of the infected cell are shown to the right of image "a" in FIG. 18.

The spatial and temporal sensitivity of the integrated phase are also calibrated using a gold mirror. The spatial sensitivity of the QPI was measured as phase having a normal distribution of $\sigma_s$=64.6 pm across the full field, as seen in the plot "b" (scale bar=20 µm) and the quantitative phase histogram of the full field in plot "c." The temporal sensitivity between 100 consecutive acquisitions is also calibrated in the histogram in plot "d", obtaining a lower noise level of $\sigma_t$=51.7 pm. Silica microsphere size standards (e.g., Corpuscular Inc., $\phi$=6.4 µm) are used to validate the quantitative phase imaging accuracy. Images "e" and "f" are the DIC images of silica microspheres with horizontal and vertical shear, respectively. The physical width and height of the silica microspheres, as labelled in plot "g" (scale bar=5 µm) are consistent with the manufacture's specification. The inset illustrates the physical thickness curve along the line across the upper microsphere.

In conclusion, a dual-modality system for quantitative birefringence and phase imaging has been demonstrated. Imaging modes can be easily switched by the insertion and removal of a Nomarski prism. A unified theoretical treatment provides rigorous foundation for both techniques. From the theory, a process for system birefringence background subtraction is derived to improve birefringence measurement accuracy. This is important for imaging live cells, whose birefringence is often weak and can be significantly distorted by the background. The theory also enables the correction of birefringence-induced phase error, and thus opens doors to precision phase imaging of birefringent samples. Experiments on *P. falciparum*-infected human RBCs demonstrate the system's capability for highly sensitive birefringence, DIC and phase imaging. Hemozoin crystals were visualized with high contrast and can potentially be used for quantitative studies of crystal formation and growth. This highly integrated system may find applications in label-free imaging of biological specimens where multiple intrinsic contrasts are desired.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The quantitative images or measurements obtained by this invention can be used in a wide range of applications. It may be used in life sciences R&D to quantify cell growth, proliferation, death, viability, motility, migration, mass transport, biophysics and biomechanics for applications in areas such as developmental biology, oncology, stem cells, drug development and neuroscience. It may also be used for quantitative, label-free pathology for disease diagnosis, and for computational super-resolution. Another application is to monitor cell culture for production quality control in bioprocessing industry. Further, the quantitative information can be used for in vitro diagnostics, such as quality assessment of oocytes, sperm and embryos for in vitro fertilization. The technique may also be used in metrology and materials science for device and material characterization.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A system for imaging and sensing of a sample, comprising:
   an interferometer comprising a condenser optic and an objective optic, the interferometer being configured to receive a sample positioned between the condenser optic and the objective optic in an optical pathway of the interferometer;
a light source configured to provide light to the interferometer at multiple wavelengths ($\lambda$), where the light is directed to the sample by optics of the interferometer;
a detector configured to capture a plurality of images of the sample, each image among the plurality of images being captured at a different wavelength among the multiple wavelengths ($\lambda$);
a processor configured to:
calculate interference intensity points for the plurality of images captured at the different wavelengths; and
calculate, for at least one image point of at least one image among the plurality of images, an optical path delay length between a reference field and a sample field in the system based on the interference intensity points for the plurality of images and a center wavelength among the different wavelengths; and
optical path delay (OPD) modifying optics positioned after an output of the interferometer and configured, based on the optical path delay length, to enhance contrast in images of the sample.

2. The system of claim 1, wherein the light is a band of light having wavelengths centered about the wavelength ($\lambda$).

3. The system of claim 1, wherein the light source comprises a plurality of light emitting diodes (LEDs) or lasers, each of the plurality of LEDs or lasers being configured to provide light at a respective one of the multiple wavelengths ($\lambda$).

4. The system of claim 3, wherein the OPD modifying optics comprise one or more phase plates.

5. The system of claim 4, wherein the OPD modifying optics further comprise a 4-f optical system.

6. The system of claim 1, wherein the light source comprises a tunable light emitting diode (LED) or a tunable laser configured to provide the light at the multiple wavelengths ($\lambda$).

7. The system of claim 1, further comprising a plurality of filters, each of the plurality of filters being configured to filter broadband light from the light source into light at a respective one of the different wavelengths among the multiple wavelengths ($\lambda$) for the interferometer.

8. The system of claim 7, wherein the light source comprises a broadband light source.

9. The system of claim 8, wherein the plurality of filters comprise a plurality of bandpass filters in the light source.

10. The system of claim 7, wherein at least one of the plurality of filters comprises a pixelated filter mask.

11. The system of claim 1, wherein the OPD modifying optics comprise one or more birefringent crystals and one or more polarizers.

12. The system of claim 1, wherein the interferometer comprises a light microscope.

13. An apparatus for quantitative imaging or sensing of a sample, comprising:
an interferometer comprising a condenser optic and an objective optic, the interferometer being configured to receive a sample positioned between the condenser optic and the objective optic in an optical pathway of the interferometer;
a light source configured to provide light to the interferometer at multiple wavelengths ($\lambda$), where the light is directed to the sample by optics of the interferometer;
a detector configured to capture a plurality of images of the sample, each image among the plurality of images being captured at a different wavelength among the multiple wavelengths ($\lambda$);
a processor configured to:
calculate interference intensity points for the plurality of images captured at the different wavelengths; and
calculate, for at least one image point of at least one image among the plurality of images, an optical path delay length between a reference field and a sample field in the apparatus based on the interference intensity points for the plurality of images;
optical path delay (OPD) modifying optics positioned after an output of the interferometer and configured, based on the optical path delay length, to modify an interferometer output associated with the sample; and
an add-on unit containing the OPD modifying optics, the add-on unit configured to attach to the interferometer for alignment of the OPD modifying optics with the interferometer output.

14. The apparatus of claim 13, wherein the interferometer comprises a light microscope.

15. The apparatus of claim 13, wherein the light comes from a light source configured to change wavelength without using filters.

16. The apparatus of claim 15, wherein the OPD modifying optics comprise a phase plate positioned between relay lenses.

17. The apparatus of claim 13, wherein the add-on unit comprises one or more filters aligned with the OPD modifying optics.

18. The apparatus of claim 17, wherein the one or more filters comprise a pixelated filter mask or a plurality of bandpass filters.

19. The apparatus of claim 13, wherein the OPD modifying optics comprise one or more birefringent crystals and one or more polarizers.

20. The apparatus of claim 13, wherein the add-on unit is configured to switch between different configurations of the OPD modifying optics.

* * * * *